though certain specific embodiments will be described, it will be understood that I do not intend to limit

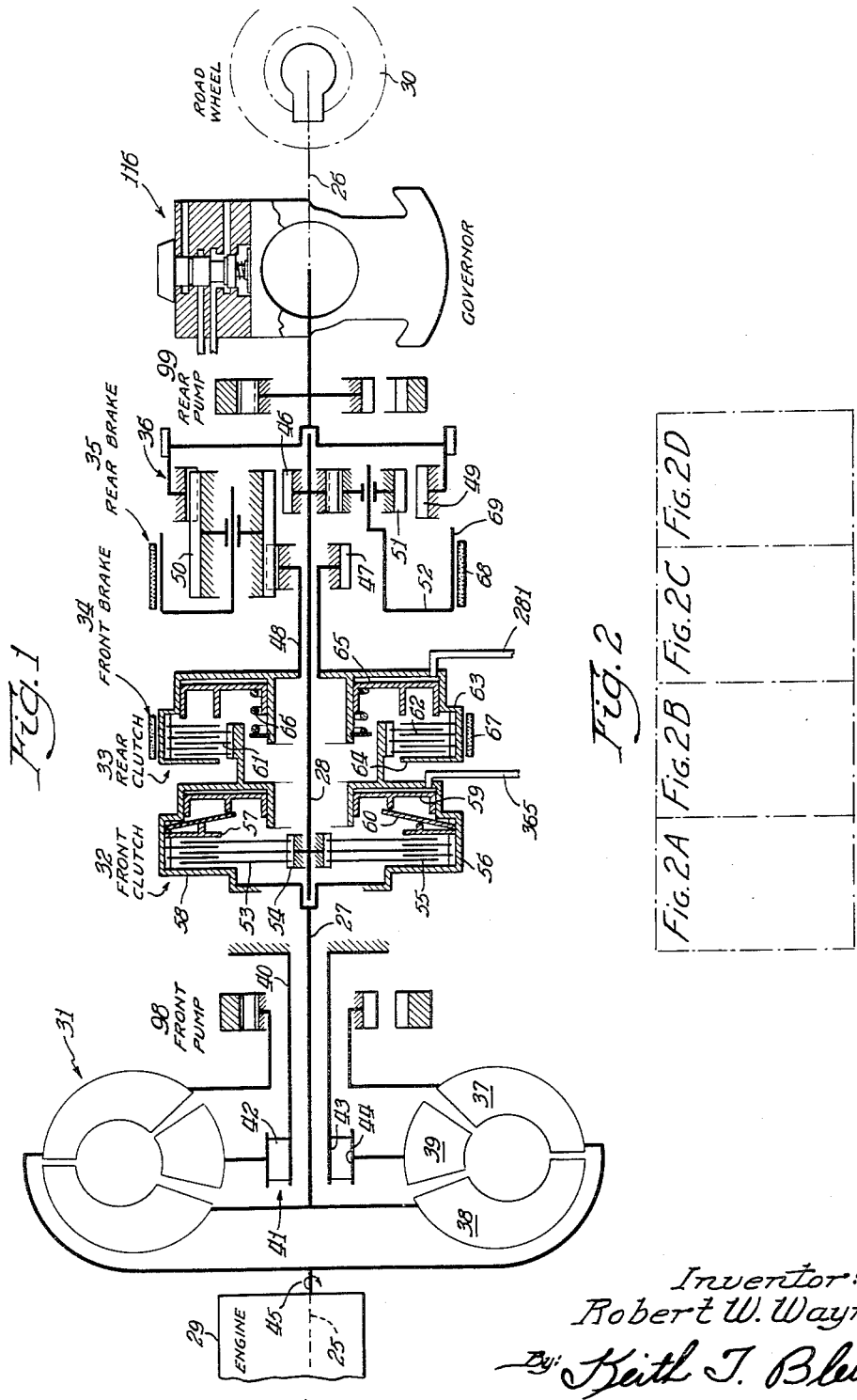

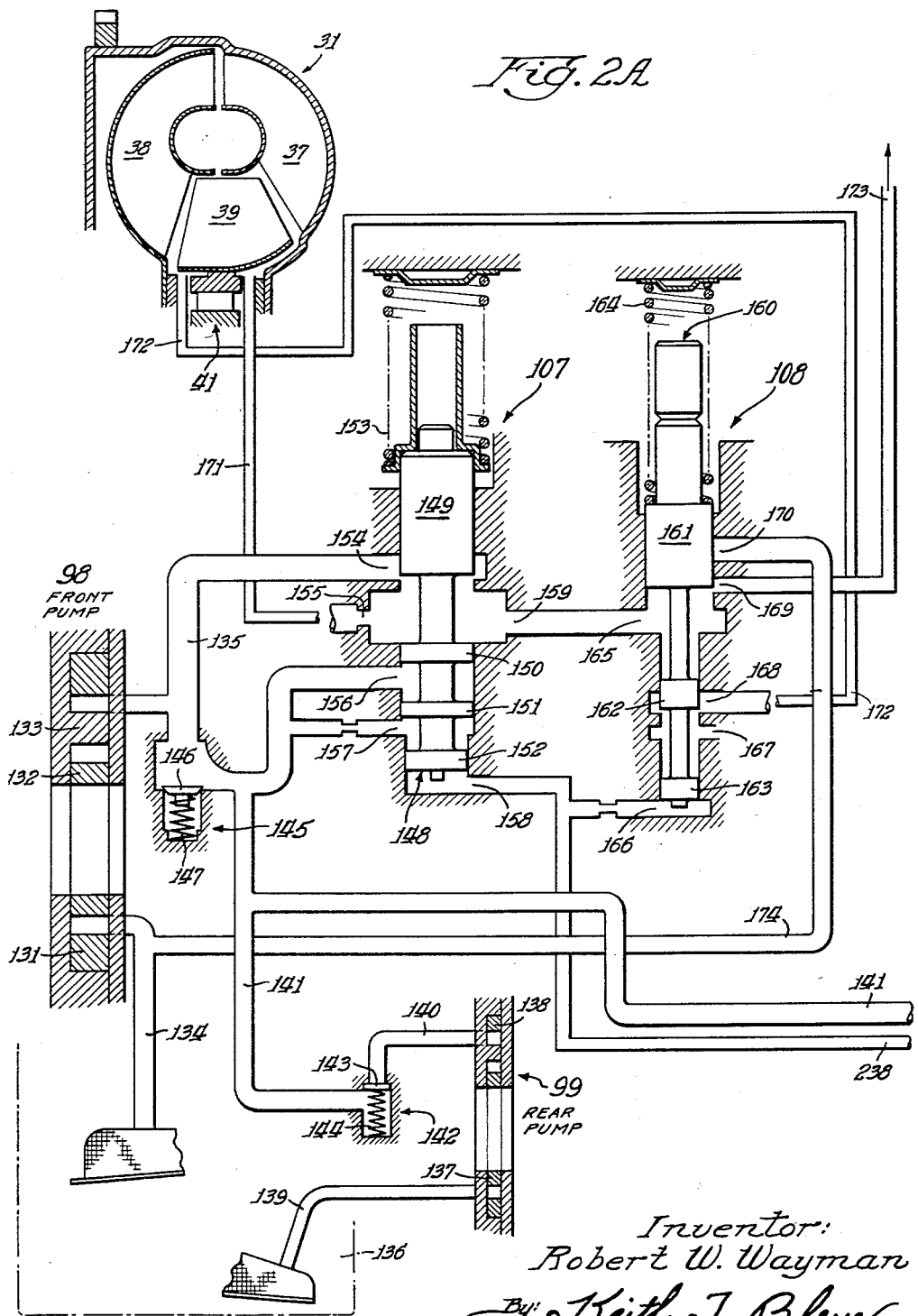

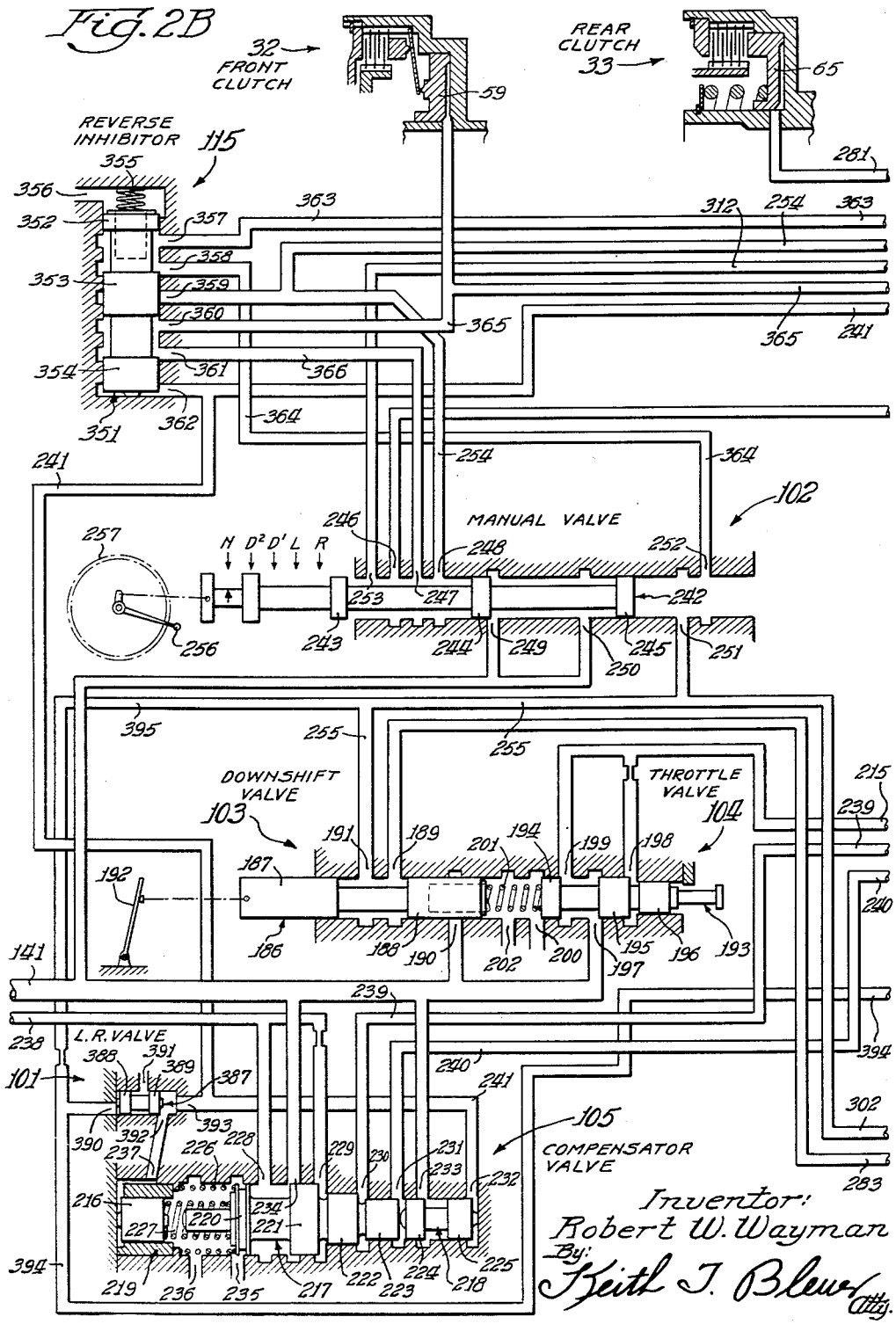

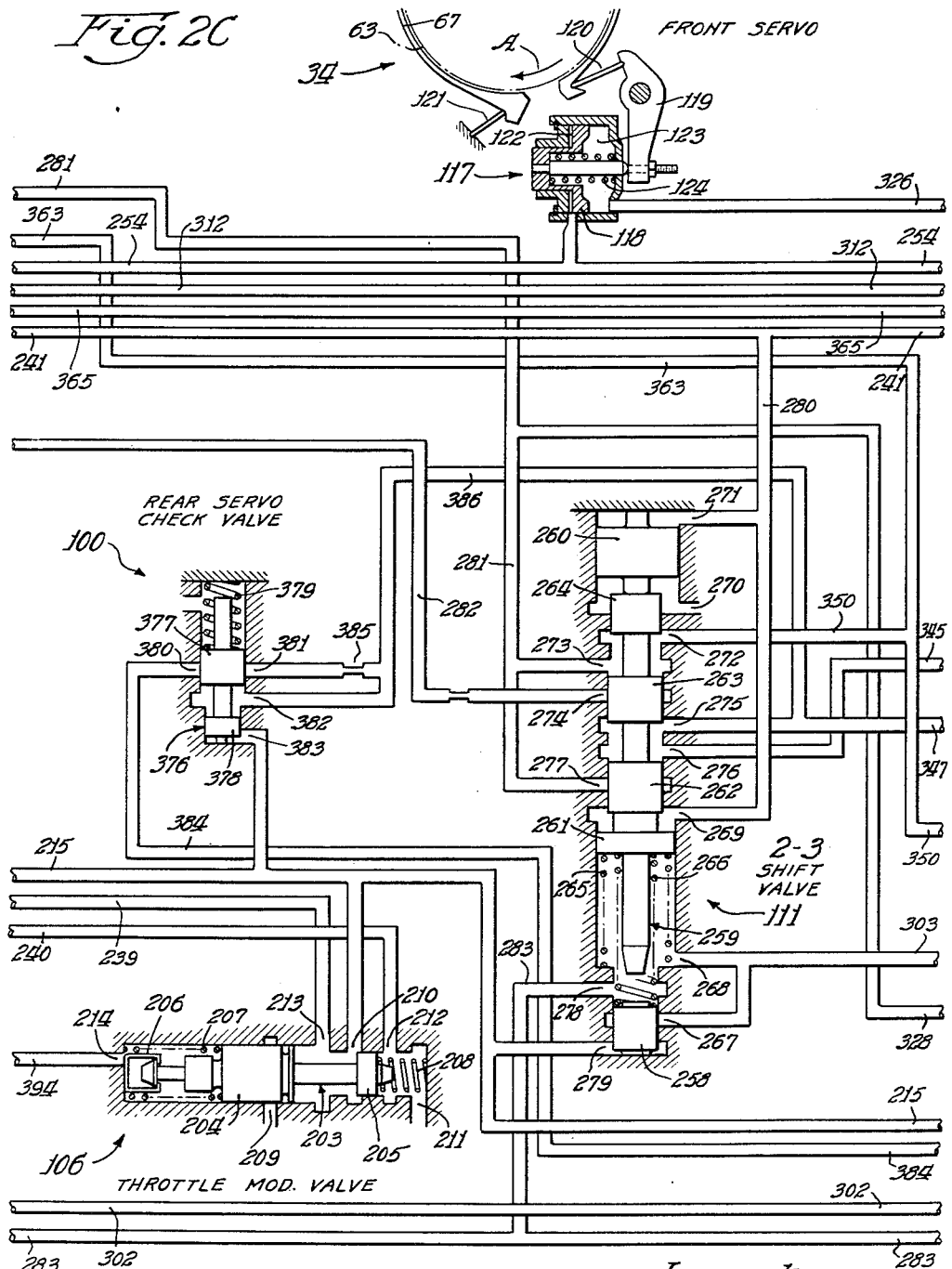

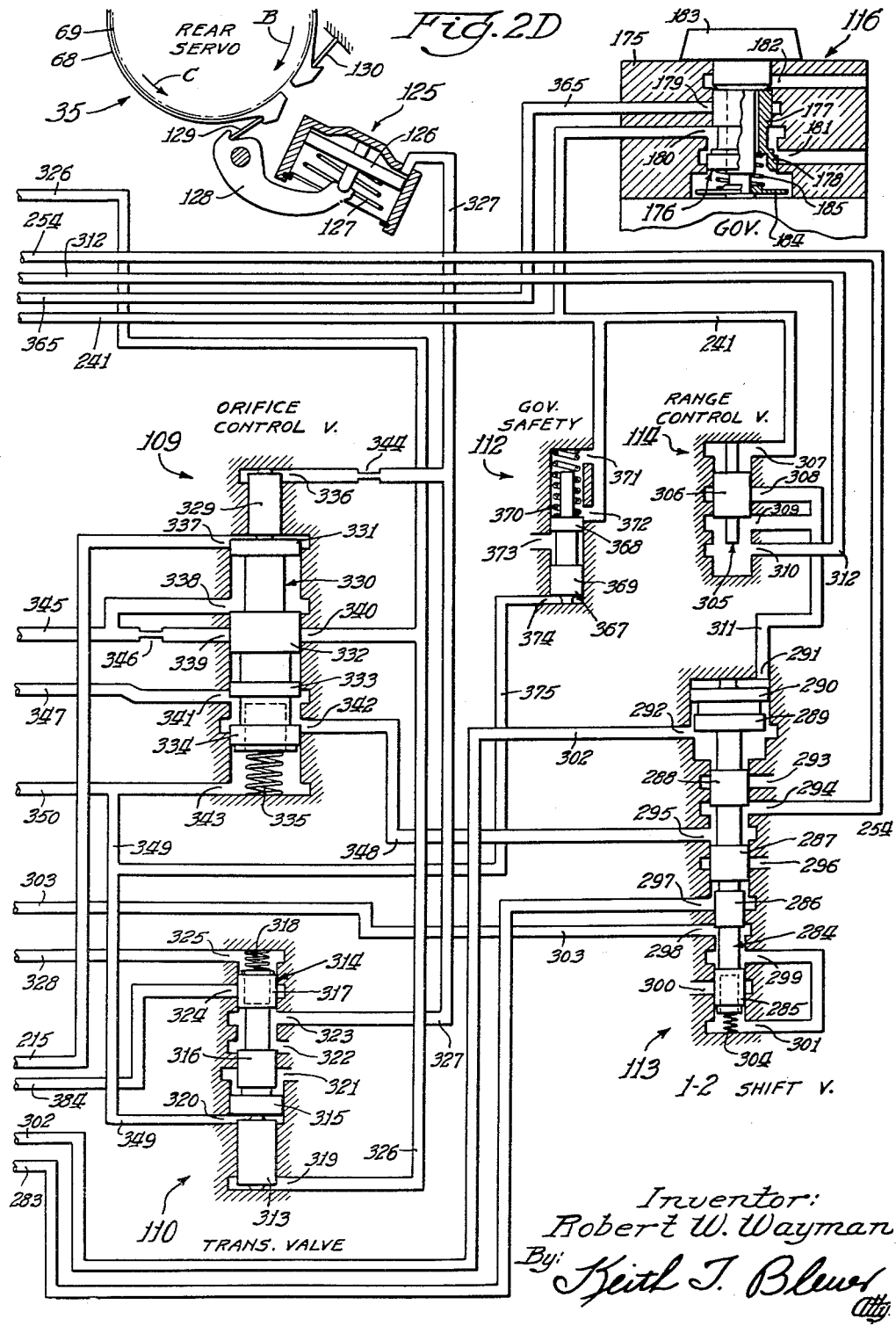

United States Patent Office 2,931,251
Patented Apr. 5, 1960

2,931,251

CONTROLS FOR TRANSMISSION

Robert W. Wayman, Muncie, Ind., assignor to Borg-Warner Corporation, Chicago, Ill., a corporation of Illinois Application October 3, 1957, Serial No. 687,898

7 Claims. (Cl. 74—754)

My invention relates to automatic transmissions for automotive vehicles and more particularly to hydraulic controlling mechanisms for such transmissions.

An automatic transmission may provide three different speed ratios in forward drive, that is, a low speed drive, an intermediate speed drive, and a direct drive. The direct drive may be completed by means of a fluid pressure engaged clutch, and the other two drives may be completed by fluid pressure engaged brakes. A selector valve under the control of the vehicle operator is commonly provided for disengaging the clutch and engaging one of the brakes for the purpose of shifting the transmission from direct drive to intermediate speed drive to provide engine braking for the vehicle.

The intermediate speed brake preferably wraps or is self-energizing for the direction of reaction when the engine is driving, and I have found that when the transmission is downshifted from direct drive to intermediate speed drive by disengaging the clutch and engaging the brake at rather high vehicle speeds, the intermediate speed brake may slip with undue wear. This is particularly true in the case in which the transmission has been designed for a vehicle engine of greater horsepower than that which is actually used and the hydraulic piston for the intermediate speed brake has accordingly been reduced in size to provide a relatively smooth engagement for shifting to intermediate speed drive from low speed drive with the vehicle engine driving.

Transmissions of this type ordinarily comprise a hydraulic torque converter which automatically provides a decreased torque multiplication as the vehicle speed increases, and accordingly, in order to provide smooth power train completions, the so-called line pressure which is applied to the clutches and brakes is decreased with increases in vehicle speed. Due to the slippage problem, however, mentioned above, such a decrease in line pressure aggravates the slippage, and it is accordingly an object of the present invention to decrease the line pressure with increases in vehicle speeds in only the ordinary forward driving ranges and to disable the line pressure decreasing mechanism in a so-called low range drive intended to be effective for providing engine braking.

It is a still more particular object of the invention to provide mechanism in a transmission of this type to cause the line pressure to increase, rather than to decrease, in the low range drive to assure that no slippage of the intermediate speed brake can occur.

The transmission control system disclosed herein is an improvement on the transmission control system shown in my prior application, Serial No. 166,136, filed June 5, 1950, and in the application of George E. Flinn, Serial No. 631,929, filed December 31, 1956.

The invention consists of the novel constructions, arrangements and devices to be hereinafter described and claimed for carrying out the above stated objects and such other objects as will be apparent from the following description of a preferred form of the invention, illustrated with reference to the accompanying drawings, wherein:

Fig. 1 is a schematic diagram of a transmission with which the hydraulic controls of the invention may be used;

Fig. 2 is a table showing the manner in which Figs. 2A, 2B, 2C and 2D may be placed together for the purpose of forming a schematic illustration of the hydraulic transmission control system of the invention; and Figs. 2A, 2B, 2C and 2D are respectively parts of the hydraulic control system of the invention which should be placed together in the manner indicated in Fig. 2.

Like characters of reference designate like parts in the several views.

The transmission with which my improved hydraulic controls are adapted to cooperate may be seen in Fig. 1 to comprise a drive shaft 25, a driven shaft 26, and intermediate shafts 27 and 28. The shaft 25 may be the usual crank shaft of the engine 29 of the vehicle, and the shaft 26 may be connected with the usual driving road wheels 30 of the vehicle by any suitable well-known power transmitting mechanism. The shafts 27 and 28 are in effect piloted with respect to the shafts 25 and 26. The transmission comprises in general a hydraulic torque converter 31, hydraulically operated friction clutches 32 and 33, hydraulically operated friction brakes 34 and 35 and a planetary gear set 36.

The hydraulic torque converter 31 comprises a vaned impeller element 37, a vaned rotor or driven element 38, and a vaned stator or reaction element 39. The impeller 37 is driven from the drive shaft 25, and the rotor 38 is fixed to the intermediate shaft 27. The stator 39 is rotatably disposed on a stationary sleeve 40, and a one-way brake 41 is disposed between the stator and the sleeve 40. The one-way brake 41 may be of any suitable construction, and, in the illustrated embodiment, comprises a plurality of tiltable sprags 42 disposed between an inner race surface 43 fixed with respect to the sleeve 40 and an outer race surface 44 fixed with respect to the stator 39. The one-way brake 41 is so arranged as to allow a free rotation of the stator 39 in the forward direction, that is, in the same direction in which the drive shaft rotates and which is indicated by the arrow 45 and prevents a rotation of the stator in the reverse direction.

The torque converter 31 functions in a manner well-known for such torque converters for driving the rotor or driven element 38 at an increased torque with respect to the torque impressed on the impeller 37 of the converter. The vanes of the stator 39 function to change the direction of flow of fluid between the rotor and impeller so as to provide this increased torque on the driven element 38. In this case, the reaction on the stator 39 is in the direction reverse to the direction of rotation of the drive shaft 25, so that the one-way brake 41 engages and prevents rotation of the stator in this direction. When the speed of the rotor 38 reaches a predetermined value, the reaction on the stator vanes 39 changes in direction, tending to rotate the stator in the forward direction; and the brake 41 releases and allows such rotation of the stator. In this case, the torque converter 31 functions as a simple fluid coupling which drives the rotor 38 at substantially the same speed and with no increase in torque with respect to the impeller 37.

The planetary gear set 36 comprises a sun gear 46 which is fixed on the shaft 28, a second sun gear 47 fixed on a sleeve portion 48 which is rotatable on the shaft 28, a ring gear 49 fixed with respect to the driven shaft 26, a plurality of planet gears 50, a plurality of planet gears 51 and a planet gear carrier 52. Each planet gear 50 and each of the planet gears 51 is rotatably disposed on and is carried by the carrier 52. The carrier 52 is rotatably disposed with respect to the shaft 28 and the shaft portion 48 by any suitable bearings. The planet gears 51 are each in mesh with the sun gear 46 and also with a planet gear 50. The gears 50 are also in mesh with the ring gear 49 and with the sun gear 47.

The clutch 32 is arranged to connect the shaft 27 driven by the rotor 38 with the shaft 28 and the sun gear 46 fixed thereon. The clutch 32 comprises clutch discs 53 splined on a hub member 54 which is fixed on the shaft 28. The clutch also comprises clutch discs 55 interleaved between the discs 53 and fixed within a member 56, that is, in turn fixed to the shaft 27 so as to be driven by this shaft.

The clutch 32 comprises a movable pressure plate 57 splined within the member 56 and adapted to press the friction discs 53 and 55 together in frictional engagement between it and an enlarged annular part 58 of the shaft 27. An annular piston 59 is provided for actuating the movable pressure plate 57. The pressure from the piston 59 is transmitted to the pressure plate 57 through a spring strut 60 which is in the form of an annular Belleville washer. The strut 60 at its inner periphery is acted on by the piston 59 so that its inner periphery moves axially with respect to its outer periphery and moves the pressure plate 57 which is acted on by the strut 60 at intermediate points thereof. The inherent resilient action of the strut 60 functions to return the piston 59 back into its illustrated position when fluid pressure, applied as will be hereinafter described, is released from the piston.

The clutch 33 is arranged to connect the part 56 and thereby the shaft 27 with the shaft portion 48 and the sun gear 47 and comprises clutch discs 61 splined onto the member 56 and clutch discs 62 splined within a member 63 which is fixed to the shaft portion 48. A pressure plate portion 64 is fixed to the member 63 on one side of the clutch discs, and an annular hydraulic piston 65 is provided on the other side of the discs for compressing the discs between it and the pressure plate portion 64. A return spring 66 is provided for acting on the piston 65 and yieldably holding it in its clutch disapplying position.

The brake 34 comprises a brake band 67 adapted to be contracted on the part 63 for thereby braking the sun gear 47. The brake 35 comprises a brake band 68 adapted to be contracted on a drum portion 69 of the planet gear carrier 52.

In operation, the transmission has a neutral condition and provides low, intermediate and high speed ratios in forward drive and a drive in reverse. The transmission is in neutral condition when the clutches 32 and 33 and the brakes 34 and 35 are disengaged.

The low speed forward drive may be obtained by engaging the clutch 32 and the brake 35. The clutch 32 is engaged by applying fluid pressure to the piston 59. The low speed power train exists from the drive shaft 25 through the torque converter 31, the intermediate shaft 27, the clutch 32, the shaft 28 and the planetary gear set 36 to the shaft 26. For this drive, the reaction on the planet gear carrier 52 or the tendency of the carrier 52 to rotate is in the reverse direction; and the brake 35 is effective to prevent such rotation of the carrier 52, so that the carrier 52 is held stationary and thus constitutes the reaction element of the gear set 36. The shaft 28, driven as just described, drives the sun gear 46 which constitutes the driving element of the gear set 36. The drive is transmitted through the planet gears 50 and 51 from the sun gear 46 to the ring gear 49 thus driving the shaft 26 at a reduced speed with respect to the shaft 28. Torque conversion takes place in both the hydraulic torque converter 31 and also in the gear set 36, so that the torque with which the shaft 26 is driven is the product of the individual torque multiplications of the hydraulic torque converter 31 and the gear set 36. It will be understood, as above described, however, that the torque conversion produced by the hydraulic torque converter 31 decreases as the speed of the driven element 38 increases, and eventually the torque converter 31 functions as a simple fluid coupling producing no torque conversion within it.

The intermediate speed power train is completed by allowing the clutch 32 to remain engaged and engaging the brake 34. The brake 35 is disengaged. The flow of power for the intermediate speed power train is the same as for the low speed power train; however, for the intermediate speed power train, the sun gear 47 is the reaction element of the gear set 36 rather than the carrier 52, the gear 47 for the intermediate speed drive being held stationary by the brake 34. Since there are sets of two planet gears 50 and 51 between the sun gear 46 and the ring gear 49; and since the sun gear 47 is in mesh with the gears 50, the ring gear 49 and thereby the shaft 26 are driven at a reduced speed with respect to the shaft 28 which is, however, higher than for the low speed drive.

The high speed power train is obtained by allowing the clutch 32 to remain engaged and engaging the clutch 33 in lieu of the brake 34. The clutch 33 may be engaged by applying fluid pressure to its piston 65. In this drive, the shaft 27 is driven through the torque converter 31 from the drive shaft 25 as in intermediate speed drive. The shaft 27 is connected through the clutch 32 to drive the sun gear 46 as was the case in intermediate speed drive. The clutch 33 functions to connect part 56, which is connected to the shaft 27, with the part 63 and thereby with the sun gear 47. Thus, both the sun gear 46 and also the sun gear 47 are driven by the shaft 27, and as is well-known in connection with planetary gear sets, when two elements of the gear set are driven at the same speed, the gear set becomes locked up so that all of its gears and elements rotate as a unit. There is thus a direct drive between the shafts 27 and 26. The converter 31 may be expected to function as a simple fluid coupling, generally, in this drive; and there thus exists a substantially direct drive between the drive shaft 25 of the transmission and its driven shaft 26.

Reverse drive may be obtained through the transmission by engaging the brake 35 and the clutch 33. The power train for this drive is from the drive shaft 25 through the torque converter 31, the intermediate shaft 27, the clutch 33, the sun gear 47, the planet gears 50 and the ring gear 49 to the driven shaft 26. The brake 35 causes the planet gear carrier 52 to function as the reaction element of the gear set; and in this case, the reaction on the carrier 52 is in the forward direction. Since there are only the single planet gears 50 between the sun gear 47 which drives and the ring gear 49 which is driven, the ring gear 49 and the shaft 26 will be driven at a reduced speed in the reverse direction with respect to the shaft 27. For this drive, the torque converter 31 generally functions to increase torque; and thus the torque impressed on the shaft 26 is the product of the torque increased by the torque converter 31 and the planetary gear set 36.

It is believed that the construction of the transmission will be apparent from the diagrammatic illustration in Fig. 1 and that a person skilled in the art can supply the various detailed parts, such as bearings, to build an actual device; however, for an actual illustration of such detailed parts, the copending application of Robert W. Wayman, Serial No. 166,136, filed June 5, 1950, which discloses a similar transmission, may be referred to.

The hydraulic control system for the transmission comprises, in general, a front pump 98, a rear pump 99, a rear servo check valve 100, a low range valve 101, a manual valve 102, a downshift valve 103, a throttle valve 104, a compensator valve 105, a throttle modulator valve 106, a main oil pressure regulator valve 107, a low oil pressure regulator valve 108, an orifice control valve 109, a transition valve 110, a 2–3 shift valve 111, a governor safety valve 112, a 1–2 shift valve 113, a range control valve 114, a reverse inhibitor valve 115 and a governor valve 116.

The brake 34 is applied by means of a hydraulic motor 117. The motor 117 comprises a piston 118 connected by means of a bell crank 119 and a strut 120 with one end of the brake band 67, the other end of the brake band 67 being held fixed by means of a strut 121. The motor 117 has a brake applying fluid pressure cavity 122 and a brake disapplying fluid pressure cavity 123, and a spring 124 acts on the piston tending to hold it in its brake disapplying position. Fluid pressure supplied to the cavity 122 moves the piston 118 against the spring 124 so as to move one end of the brake band 67 to engage it with the drum 63. It may be noted at this point that the direction of reaction on the sun gear 47 and the drum 63 is in the reverse direction as indicated by the arrow A when the brake 34 is engaged for the intermediate speed ratio power train. This direction is opposite the direction of rotation of the drive shaft 25 indicated by the arrow 45; and the drum 63, in tending to rotate in this direction, augments the action of the strut 120 in engaging the band 67 and causes increased band engagement, since the drum 63 tends to carry the end of the band acted on by the strut 120 in the same direction in which this end of the band is urged by the strut 120. It is apparent that the band 67 wraps or is partially self-energizing for this rotative tendency of the drum 63.

The brake 35 is engaged by means of a fluid pressure motor 125 which comprises a piston 126 movable by fluid pressure applied thereto against the action of a spring 127. Motion of the piston 126 is transmitted to one end of the brake band 68 by means of a bell crank 128 and a strut 129, the other end of the brake band 68 being held fixed by means of a strut 130. In low speed drive through the transmission, the reaction on the planet gear carrier 52 and on the drum 69 is in the reverse direction as indicated by the arrow B, and this reaction or tendency to rotate tends to unwarp the band 68 with respect to the drum 69. For reverse drive through the transmission, the reaction on the brake drum 69 is in the forward direction as indicated by the arrow C, that is, in the same direction as the drive shaft 25 rotates. The tendency of the drum 69 to rotate in this direction assists the strut 129 in forcing the movable end of the band 68 to move in the direction indicated by the arrow C, and the brake 35 thus wraps or is self-energizing for this direction of reaction, so that the braking effect is greater than would be the case if there were no tendency for the drum to rotate. The reaction on the drum 69 is greater for reverse drive than for low forward drive, and hence, the brake 35 has been constructed to wrap for the reaction for reverse drive instead of that for low speed forward drive.

The pump 98 may be of any suitable fixed displacement type and may comprise an outer gear 131 and an inner gear 132 and a crescent-shaped casing portion 133 between the gears. The gears 131 and 132 carry fluid between their teeth and across the inner and outer surfaces of the casing portion 133 so as to draw fluid from an inlet conduit 134 and discharge it into an outlet conduit 135. The inlet conduit 134 is adapted to draw fluid, such as oil, from a sump 136. The pump 98 is driven directly from the drive shaft 27 through the impeller 37. The pump 99 is of the same construction as the pump 98, having inner and outer gears 137 and 138, and is driven from the driven shaft 26 of the transmission. The pump 99 draws fluid from the sump 136 through an inlet conduit 139 and discharges it into an outlet conduit 140.

A conduit 141 constitutes the supply or line pressure conduit for engaging the power train completing friction clutches and brakes and also for supplying various valves in the transmission control system with fluid pressure. A check valve 142 is disposed between the conduits 140 and 141 and comprises a piston 143 yieldably held in its closed position by means of a spring 144. The check valve 142 blocks fluid flow from the conduit 141 to the conduit 140 and the rear pump 99.

A similar check valve 145 comprising a piston 146 and a spring 147 acting on the piston is provided between the line pressure conduit 141 and the outlet conduit 135 for the front pump 98. The check valve 145 functions to prevent fluid flow from the line pressure conduit 141 to the conduit 135 when the pressure in the latter conduit is lower than in the conduit 141.

The main pressure regulator valve 107 functions to regulate pressure in the line pressure conduit 141. The valve 107 comprises a piston 148 having lands 149, 150, 151 and 152. A spring 153 is provided for moving the piston 148 downwardly as seen in the figure. The valve 107 comprises ports 154, 155, 156, 157, 158 and 159. The ports 156 and 157 are connected with the line pressure conduit 141, and the port 154 is connected with the outlet conduit 135 of the pump 98. The ports 155 and 159 are permanently connected around the piston 148.

The valve 108 is a regulator valve for regulating the pressure within the hydraulic torque converter 31. The valve 108 comprises a valve piston 160 having lands 161, 162 and 163. A spring 164 is provided between the land 161 and a stationary part for yieldably holding the piston 160 downwardly. The valve 108 comprises ports 165, 166, 167, 168, 169 and 170. The port 165 is connected with the ports 159 and 155 which are in permanent connection around the valve piston 148 and also with the torque converter 31 through a torque converter inlet conduit 171; the port 166 is connected with the port 158 of the valve 107; the port 167 is a bleed port adapted to discharge into the sump 136; the port 168 is connected by means of a torque converter outlet conduit 172 with the torque converter 31; the port 169 is connected with a conduit 173 which supplies lubricating oil to any suitable parts of the transmission; and the port 170 is connected by means of a conduit 174 with the pump inlet conduit 134.

The governor valve 116 is for the purpose of providing a speed responsive fluid pressure for causing various ratio changes through the transmission. The governor valve 116 comprises a casing 175 which is fixed on the driven shaft 26 and a piston 176 slidably disposed in a cavity within the casing 175. The piston 176 is provided with lands 177 and 178. The governor valve 116 comprises ports 179, 180, 181 and 182. The ports 181 and 182 are bleed ports discharging into the sump 136. A governor weight 183 extends through and is slidably disposed within the governor piston 176. The weight 183 has a spring retainer washer 184, fixed on its inner end and a spring 185 extends between the retainer washer 184 and an internal shoulder formed within the piston 176 for yieldably holding the weight 183 and the valve piston 176 together in the relative positions in which they are illustrated.

The throttle valve 104, the compensator valve 105 and the throttle modulator valve 106 provide pressure that varies with the position of the accelerator of the vehicle for varying the shift points of the transmission and also varying the pressures that are applied to the various clutches and the brakes of the transmission. The throttle valve 104 is under the control of the downshift valve 103. The downshift valve 103 comprises a valve piston 186 having lands 187 and 188. The downshift valve 103 comprises ports 189, 190 and 191. The port 190 is connected with the line pressure supply conduit 141. The valve piston 186 is under the control of the vehicle accelerator 192 by any suitable connecting mechanism so that when the accelerator 192 is moved toward an open throttle position, it coordinately moves the piston 186 to the right as seen in the drawings. It will be understood that the accelerator 192 has the usual connections with the carburetor of the vehicle engine 29.

The throttle valve 104 comprises a piston 193 having lands 194, 195 and 196. The valve 104 comprises ports 197, 198, 199 and 200. A spring 201 is provided between the valves 103 and 104. The port 197 is connected with the line pressure supply conduit 141; the port 198 which is relatively restricted is connected with the port 199; and the port 200 is a bleed port. A bleed port 202 is provided between the two valves 103 and 104.

The throttle modulator valve 106 comprises a piston 203 having lands 204 and 205. A sheet metal spring retainer 206 embraces an end of the piston 203 and a spring 207 is provided between the land 204 and the retainer 206. A spring 208 is provided between the land 205 and the adjacent end of the cavity in which the piston 203 is disposed. The valve 106 comprises ports 209, 210, 211, 212, 213 and 214. The ports 209 and 211 are bleed ports, and the port 210 is connected with a throttle pressure supply circuit 215 to which the ports 198 and 199 of the throttle valve 104 are also connected.

The compensator valve 105 comprises pistons 216, 217, and 218. The piston 216 constitutes a simple plug slidably disposed in a stationary sleeve 219. The piston 217 comprises lands 220, 221, 222, and 223. The piston 218 comprises lands 224 and 225. A spring 226 is disposed between the land 220 and the fixed sleeve 219, and a spring 227 is disposed between the land 220 and the movable plug 216.

The compensator valve 105 is provided with ports 228, 229, 230, 231, 232, 233, 234, 235, 236 and 237. The port 229, which is relatively restricted, and the port 228 are connected by means of a compensator pressure supply conduit 238 with the ports 158 and 166 of the pressure regulator valves 107 and 108; the port 230 is connected by means of a conduit 239 with the port 213 of the valve 106; the port 231 is connected by means of a conduit 240 with the port 212 of the valve 106; the port 232 is connected with a governor pressure supply conduit 241 that is also connected with the port 180 of the governor valve 116, the ports 233 and 234 are connected with the line pressure supply conduit 141; the ports 235 and 236 are bleed ports; and the port 237 is also connected with the governor pressure supply conduit 241 through the low range valve 101 as will be hereinafter described in greater detail.

The various ranges of operation of the transmission are under the control of the manual valve 102. The valve 102 comprises the valve piston 242 having lands 243, 244 and 245. The valve is provided with ports 246, 247, 248, 249, 250, 251, 252 and 253. The port 248 is connected by means of a conduit 254 with the piston 118, particularly with the cavity 122; the ports 249 and 250 are connected with the line pressure supply conduit 141; and the port 251 is connected by means of a conduit 255 with the port 191 of the downshift valve 103. The manual valve piston 242 is controlled from the driver's compartment by means of a selector lever 256 located directly beneath the vehicle steering wheel 257, the selector lever being connected by any suitable connecting mechanism with the piston 242, so that the piston 242 can be moved into any of its principal positions which are N, D-2, D-1, L, and R corresponding to neutral, high drive range with the start in intermediate, high drive range with the start in low, low range and reverse drive, respectively.

The 2-3 shift valve 111 causes engagement and disengagement of proper clutch and brake (clutch 33 and brake 34) for causing changes between second and third speed drives. The valve 111 comprises pistons 258, 259, and 260. The piston 258 is a simple plug. The piston 259 is provided with lands 261, 262, 263 and 264. A spring 265 is disposed between the land 261 and a stationary part for urging the piston 259 upwardly as seen in the drawing, and a spring 266 is provided between the land 261 and the piston 258. The piston 260 is also a simple plug. The valve 111 is provided with ports 267, 268, 269, 270, 271, 272, 273, 274, 275, 276, 277, 278 and 279. The ports 267 and 268 are connected together; the ports 269 and 271 are connected by means of a branch conduit 280 with the governor pressure conduit 241; the port 270 is a bleed port; the ports 273 and 277 are connected by means of a conduit 281 with the piston 65 for the rear clutch 33; the port 274 is connected by means of a conduit 282 with the port 246 of the manual valve 102; the port 278 is connected by means of a conduit 283 with the port 189 of the downshift valve 103; and the port 279 is connected with the conduit 215 that is connected to the port 199 and 198 of the throttle valve 104.

The 1-2 shift valve 113 causes engagement and disengagement of the brakes 34 and 35 for causing changes between the first and the second speed drives. The valve 113 comprises a valve piston 284 provided with lands 285, 286, 287, 288, 289 and 290. The 1-2 shift valve 113 comprises ports 291, 292, 293, 294, 295, 296, 297, 298, 299, 300 and 301. The port 292 is connected by means of a conduit 302 with the port 251 of the manual valve 102; the ports 293 and 296 are bleed ports; the port 294 is connected to the conduit 254 and thereby with the supply cavity 122 of the servo motor for the brake 34; the port 297 is connected to the conduit 283; the port 298 is connected by means of a conduit 303 with the ports 267 and 268 of the 2-3 shift valve 111; the port 299 is connected with the port 301; and the port 300 is a bleed port. A spring 304 is provided in the valve 113 for urging the piston 284 upwardly.

The range control valve 114 is under the control of the manual valve 102 and determines the starting speed ratio for drive range operation. The range control valve 114 comprises a valve piston 305 having a land 306. The valve 114 comprises ports 307, 308, 309, and 310. The port 307 is connected to the conduit 241; the ports 308 and 309 are connected by means of a conduit 311 with the port 291 of the 1-2 shift valve 113; and the port 310 is connected by means of a conduit 312 with the port 253 of the manual valve 102.

The transition valve 110 is for the purpose of preventing application of the rear brake 35 in the two drive ranges and comprises valve pistons 313 and 314. The piston 313 is a simple plug; and the piston 314 is provided with lands 315, 316 and 317. A spring 318 is provided on one end of the piston 314 for moving the piston downwardly. The valve 110 comprises ports 319, 320, 321, 322, 323, 324 and 325. The port 319 is connected by means of a conduit 326 with the disapply cavity 123 of the servo motor 117 for the front brake 34; the ports 321 and 322 are bleed ports; the port 323 is connected by means of a conduit 327 with the servo motor 125 for the brake 35 and the port 325 is connected by means of a conduit 328 with the conduit 281 and thereby with the clutch 33.

The orifice control valve 109 is for the purpose of at times restricting flow of fluid with respect to the servo motors of the various friction engaging devices of the transmission and comprises valve pistons 329 and 330. The piston 329 is a simple plug, and the piston 330 comprises lands 331, 332, 333, and 334. A spring 335 is disposed at the lower end of the piston 330 for yieldably holding it in its illustrated position. The valve 109 comprises ports 336, 337, 338, 339, 340, 341, 342, and 343. The port 336 is connected to the conduit 327 through a restriction 344; the port 337 is connected to the conduit 215; the port 338 is connected by means of a conduit 345 to the port 276 of the 2-3 shift valve 111; the port 339 is connected through a restriction 346 with the conduit 345; the port 340 is permanently connected around the piston 330 with the port 339 and is connected to the conduit 326; the port 341 is connected by means of a conduit 347 with the port 275 of the 2-3 shift valve 111; the port 342 is connected by means of a conduit 348 with the port 295 of the 1-2 shift valve 113; and the port 343 is connected by means of a conduit 349 with the port 320 of the transition valve 110 and by means of a conduit 350 with the port 272 of the 2-3 shift valve 111.

The reverse inhibitor valve 115 is for the purpose of preventing a completion of reverse drive when the selector 256 is moved into its reverse drive position at relatively high forward vehicle speeds. The reverse inhibitor valve comprises a piston 351 having lands 352, 353 and 354. A spring 355 is provided for yieldably holding the piston 351 downwardly in its illustrated position. The valve 115 comprises ports 356, 357, 358, 359, 360, 361 and 362. The port 356 is a bleed port; the port 357 is connected by means of a conduit 363 with the conduit 350; the port 358 is connected by means of a conduit 364 with the port 252 of the manual valve 102; the port 359 is connected to the conduit 254; the port 360 is connected by means of a conduit 365 with both the piston 59 for the front clutch 32 and also with the port 179 of the governor 116; the port 361 is connected by means of a conduit 366 with the port 247 of the manual valve 102; and the port 362 is connected with the conduit 241.

The governor safety valve 112 is for the purpose of assuring that no governor pressure exists for reverse driving. The governor safety valve 112 comprises a piston 367 having lands 368 and 369. A spring 370 is provided for yieldably holding the piston 367 downwardly in its illustrated position. The valve 112 comprises ports 371, 372, 373 and 374. The port 371 and the port 372 are connected together and to the conduit 241; the port 373 is a bleed port; and the port 374 is connected by means of a branch conduit 375 with the conduits 349 and 350.

The rear servo check valve 100 is for the purpose of checking fluid flow at times with respect to the rear servo motor 125. The valve 100 comprises a piston 376 having two lands 377 and 378. A spring 379 is disposed between the piston 376 and one end of the cavity for the piston 376, as shown. The valve 100 is provided with ports 380, 381, 382 and 383. The port 380 is connected by means of a conduit 384 with the port 324 of the transition valve 110; the port 381 is permanently connected with the port 380 around the piston 376 and is connected through a restriction 385 with the conduit 386 that is connected to the conduit 347; the port 382 is connected to the conduit 386; and the port 383 is connected to the conduit 215.

The low range valve 101 is for the purpose of changing at times the regulation of the compensator valve 105. The low range valve 101 comprises a piston 387 having lands 388 and 389. The valve 101 is provided with ports 390, 391 392 and 393. The port 390 is connected by means of a conduit 394 with the port 214 of the throttle modulator valve 106 and by means of a conduit 395 with the conduit 255; the port 391 is a bleed port; the port 392 is connected with the port 237 of the compensator valve 105; and the port 393 is connected with the conduit 241.

In operation, the transmission is maintained in its various ranges under the control of the manual valve 102. The transmission is in neutral condition when the manual selector valve piston 242 is in its N or neutral position. When the engine 29 begins operating, the pump 98 driven by the engine supplies line pressure to the conduits 135 and 141 and connected conduits, pumping oil from the sump 136 through the pump inlet 135. The conduit 141 is connected with the conduit 135 through the check valve 145, the check valve 145 being held open by the fluid pressure from the pump 98. This fluid pressure in the conduit 141 holds the check valve 142 closed so that fluid cannot escape through the rear pump 99, which is assumed inoperative at this time with the vehicle being stationary. In the neutral condition of the piston 242, the groove between the lands 244 and 245 connects the ports 249 and 250 supplied with line pressure through the conduit 141, and the lands block flow of line pressure to any of the other ports of the manual valve 102. The manual valve piston 242 thus prevents application of fluid pressure to the engaging pistons for any of the power train completing clutches and brakes of the transmission.

The main oil pressure regulator valve 107 functions for all conditions of the transmission and its hydraulic control system to regulate the line pressure in the conduit 141 and connected conduits to predetermined maximum values. For this purpose, the line pressure from the conduit 141 is supplied through the port 157 between the lands 151 and 152; and, since the land 151 is of larger diameter than the land 152, the line pressure applied to these lands tends to move the regulator valve piston 148 upwardly against the action of the spring 153. This movement of the piston 148 tends to release the line pressure from the conduits 141 and 135 between the lower edge of the land 149 and the lower edge of the port 154 into the converter supply conduit 171 through the port 155. The spring 153 is of such strength that the port 154 will not be thus opened by line pressure influence on the valve piston 148 until a certain fixed value of line pressure is reached. This fixed value of line pressure is maintained by the valve 107 in thus metering and relieving excess fluid under pressure from the conduit 141, assuming that there are no other influences on the piston 148 than just mentioned.

For most conditions of operation, however, an additional variable force is applied to the piston 148 tending to move it, and this third force is due to fluid pressure of different values (which may be termed compensator pressure) applied to the lower end of the piston 148 through the port 158 and conduit 238. For the neutral condition of the transmission, when the accelerator 192 is in its closed throttle, relaxed position; the compensator pressure is equal to full line pressure which is supplied to the lower end of the piston 148 through the port 158. Line pressure flows from the conduit 141 through the port 234 of the compensator valve 105, the groove between the lands 220 and 221, the port 228 and the conduit 238 to the port 158. Line pressure is supplied from the compensator pressure conduit 238 through the port 229 between the lands 221 and 222; and, since the land 221 is larger than the land 222, this line pressure tends to move the compensator valve piston 217 to the left against the actions of the springs 227 and 226. However, for this condition of operation, the springs acting on the piston 217 are of sufficient strength to hold the piston 217 to the limit of its movement to the right.

The fluid pressure applied to the main oil regulator valve piston 148 on its lower end provides a force acting against the spring 153 tending to move the piston 148 upwardly as seen in the figure to more fully open the port 154 to the conduit 171. The full line pressure applied to the lower end of the piston 148 thus maintains the line pressure in the conduit 141 and connected conduits at a predetermined minimum which, for one certain embodiment of the invention, is 75 p.s.i.

The secondary main regulator valve 108 regulates the fluid pressure within the conduit 171 and thereby within the torque converter 31 to which the conduit 171 supplies fluid pressure. The pressure in the ports 155 and 159 and in the conduit 171 is applied between the lands 161 and 162 of the low oil pressure regulator valve piston 160 through the port 165. Since the land 161 is larger than the land 162, this fluid pressure tends to move the piston 160 upwardly against the action of the spring 164 to open up the port 169 and meter fluid between the land 161 and an edge of the port 169. Thus, as the fluid pressure in the conduit 171 and in the converter 31 tends to increase, the excessive fluid pressure is discharged through the port 169; and the pressure in the conduit 171 and converter 31 is regulated to a predetermined maximum.

The conduit 173 is connected to various working parts of the transmission for lubricating them; and, when this conduit is filled, the valve piston 160 moves slightly farther against the action of the spring 164 on a slight increase in pressure in the converter 31 so as to relieve fluid from the port 168 through the groove between the lands 162 and 163 and through the bleed port 167. At this time, the regulating effect of the valve 108 takes place between the land 162 and the lower edge of the port 168, and the fluid flows through the conduit 171 and through the torque converter 31 to the conduit 172 which is the fluid discharge conduit for the torque converter 31.

The compensator pressure in the conduit 238 is also applied to the valve piston 160 for changing the regulated converter pressure in the conduits 171 and 172 and in the torque converter 31 for various conditions of operation of the transmission and controls. The pressure on the lower end of the valve piston 160 tends to move the piston 160 upwardly against the action of the spring 164 to open the discharge port 168 for the torque converter to the bleed port 167 and to thus further relieve and decrease the pressure in the conduits 171 and 172 and converter 31. With full line pressure in the conduit 238 for conditions of operation just mentioned, the regulated converter pressure in the torque converter 31 is at a minimum which, for one particular embodiment of the invention, is substantially 30 p.s.i.

Under certain relatively abnormal conditions, as, for example, when the oil in the sump 136 is cold; the conduit 174 relieves the fluid pressure in the converter 31 and in its supply conduit 171. The resultant increased pressure due to cold oil in the conduit 171 applied to the relatively large land 161 will move the piston 160 still farther upwardly against the action of the spring 164 so as to connect the ports 170 and 165 by means of the groove between the lands 161 and 162. In this case, the regulating action by the valve piston 160 is by virtue of a metering effect between the lower edge of the land 161 and the port 170, and the excessive fluid flowing through the port 170 flows directly through the conduit 174 to the inlet conduit 134 of the pump 98.

The transmission and its control system are conditioned for operation in the D2 range, that is, in automatic range in which the vehicle starts in intermediate speed drive, by moving the manual selector valve piston 242 into its D2 position. In this position, the piston 242 provides a connection between the ports 253, 246, 247, 248 and 249 by means of the groove between the lands 243 and 244. The port 249 carries line pressure, being connected with the line pressure supply conduit 141. The line pressure is thus supplied to the ports 248, 247, 246 and 253.

Pressure from the port 248 flows through the conduit 254 to the port 359 of the reverse inhibitor valve 115 and is blocked at that port by the land 353 of the inhibitor valve piston 351 at this time. Line pressure is also supplied from the conduit 254 to the apply cavity 122 of the servo motor 117 for the front brake 34, and the piston 118 thus moves and applies the band 67 of the brake 34 to engage the brake through the intermediary of the bell crank 119. Line pressure is also supplied from the conduit 254 to the port 294 of the 1–2 shift valve 113 but is blocked at that port at this time as will be described.

The line pressure in the port 247 flows through the conduit 366, the port 361 of the reverse inhibitor valve 115, the groove between the lands 353 and 354, the port 360 and the conduit 365 to the piston 59 of the clutch 32 thus applying the clutch. Line pressure also flows through the conduit 365 to the port 179 of the governor valve 116, but under standstill or low speed conditions, the port 179 is blocked by the land 177 of the valve 116.

The line pressure in the port 246 of the manual valve 102 flows through the conduit 282 to the port 274 of the 2–3 shift valve 111, and the land 263 of this valve blocks the port 274 at this time.

The line pressure at the port 253 of the manual valve 102 flows through the conduit 312 and the port 310 of the range control valve below the piston 305 of this valve, and through the port 309 and the conduit 311 to the port 291 of the 1–2 shift valve 113. The line pressure below the valve piston 305 at this time maintains the piston 305 in its illustrated position. The line pressure applied through the port 291 acts on the land 290 of the 1–2 shift valve and moves the piston 284 of this valve to its intermediate speed position at the limit of its movement downwardly as seen in the figure against the action of the spring 304, so that the land 288 of the piston 284 blocks the port 294 which is supplied with line pressure at this time as has been described.

Since the clutch 32 is engaged due to line pressure from the port 247 of the manual valve and the brake 34 is engaged due to line pressure from the port 248 of the manual valve, the transmission is in intermediate speed drive.

When the intermediate speed power train is completed as just described, by engagement of the clutch 32 and the brake 34, the accelerator 192 is assumed to be in its closed throttle position with the vehicle engine crankshaft rotating at idling speed. Under these conditions, insufficient power is transmitted through the intermediate speed power train and in particular through the hydraulic torque converter 31 for driving the driven shaft 26 and the vehicle, and the drive may be made effective for driving the vehicle by simply depressing the accelerator 192 to open the engine throttle.

Throttle opening movement of the accelerator 192 also has other effects on the hydraulic control system, including an increasing of the line pressure in the conduit 141 and connected conduits for increasing the applying pressure for the brake 34 and the clutch 32, and throttle opening movement also effects an increasing of the fluid pressure within the hydraulic torque converter 31.

The accelerator 192 acts on the throttle valve piston 193 through the intermediary of the downshift valve piston 186 to provide a throttle pressure in the conduit 215 which is less than the line pressure in the conduit 141 and which increases from zero at closed throttle position of the accelerator to line pressure at open throttle position. The throttle valve 104, like the valves 107 and 108, is a regulator valve providing a variable fluid pressure by metering fluid flow between a valve land and a valve port in accordance with variable forces impressed on the valve. The accelerator 192 tends to move the throttle valve piston 193 to the right as seen in the figure, upon depression of the accelerator, by means of the downshift valve piston 186 and the spring 201. Such movement of the throttle valve piston 193 provides a connection between the ports 197 and 199 through the groove between the lands 194 and 195, admitting fluid under pressure into the conduit 215 through the port 199. The pressure in the conduit 215 flows back through the port 198 and is thus effective on the lands 195 and 196. Since the land 195 is of larger diameter than the land 196, the fluid pressure on the lands tends to move the valve piston 193 back to the left against the action of the spring 201, so that the land 195 tends to again close the port 197 and block further admittance of fluid pressure to the conduit 215. The greater the depression of the accelerator, the greater will be the force from the spring 201 on the throttle valve piston 193, and the greater must be the pressure in the conduit 215 for closing the port 197 by the land 195; and hence, the valve 104 has a regulating action to provide a throttle pressure in the conduit 215 which increases with accelerator depression.

The throttle pressure from the throttle valve 104 is supplied through the conduit 215 to the throttle modulator valve 106 through the port 210. The valve 106 functions to provide a limited or so-called modulator pressure in the conduit 239. This limited pressure in the conduit 239 is the same as the throttle pressure in the conduit 215 up to a predetermined maximum value, and for further increases in throttle presure corresponding to increased openings of the engine throttle, the modulator pressure in the conduit 239 remains at this predetermined maximum value. The throttle pressure in the conduit 215 flows through the port 210 of the throttle modulator valve and through the groove between the lands 204 and 205 to the port 213 and the conduit 239. The spring 208 is a relatively light spring as compared to the spring 207, and this spring 208 functions to normally maintain the valve piston 203 in its illustrated position with the spring retainer 206 contacting the adjacent end of the bore for the piston 203 and with the spring 207 holding the retainer 206 and the piston 203 at the limit of their movement apart. The spring 208, under these conditions, is substantially at its free length and assures that the ports 210 and 213 remain in communication by means of the groove between the lands 204 and 205 until the modulator pressure in the conduit 239 reaches its predetermined value.

The modulator pressure in the conduit 239 is applied to the lands 204 and 205 of the throttle modulator valve 106, and since the land 204 is larger than the land 205, this fluid pressure tends to move the piston 203 to the left against the action of the spring 207, the spring retainer being bottomed under these conditions on the adjacent end of the cavity in which the piston 203 is disposed. When the fluid pressure in the conduit 239 reaches its predetermined maximum value, the pressure moves the piston 203 to the left and closes the port 210 by means of the land 205, so that the pressure of the fluid in the conduit 239 increases no further. In the particular embodiment of the invention mentioned before, the modulator pressure in the conduit 239 had a maximum of 22 p.s.i. at about 25% throttle opening, and the modulator pressure remained constant for additional throttle opening movements of the accelerator.

The modulator pressure in the conduit 239 is applied to the compensator valve 105, which is a regulator valve, for providing a compensator pressure in the conduit 238 that decreases with depression of the accelerator pedal for initial throttle opening movements of the accelerator. The compensator pressure in the conduit 238 also increases with the speed of the driven shaft 26 and the vehicle. In this connection, the action of the governor valve 116 in producing a governor pressure in the conduit 241 which is connected to the compensator valve, will now be described.

The governor valve 116, like the valves 104 and 105, is a regulator valve; that is, it produces an output pressure that varies gradually with changing forces on the valve. The casing 175 for the valve 116 rotates with the driven shaft 26 of the transmission, and the valve piston 176 and the weight 183 tend to move outwardly under the influence of centrifugal force. The weight 183, in particular, has a relatively large centrifugal force acting on it, and this force is transmitted to the hollow valve piston 176 by means of the spring 185 disposed between the piston 176 and the spring retainer 184. Line pressure is present in the conduit 365; and, on outward movement of the valve piston 176, fluid flows through the port 179, the groove between the lands 177 and 178, and the port 180 into the conduit 241 to supply pressure to the latter conduit. The pressure in the conduit 241 is applied to the facing ends of the lands 177 and 178, and since the land 177 is larger in diameter than the land 178, this fluid pressure tends to move the piston 176 inwardly of the valve casing 175, so that the land 177 will move over the port 179 and block any further admission of fluid pressure to the conduit 241. A balance is attained between the centrifugal force effective on the valve piston 176 tending to move the piston outwardly of the casing 175, which increases with vehicle speed, and the force in the conduit 241 effective on the lands 177 and 178 tending to move the piston 176 inwardly, which increases with the pressure in the conduit 241, for every speed of the driven shaft 26. The valve piston 176 thus meters the flow of fluid under pressure to the governor output conduit 241 between the land 177 and the inner edge of the port 179 and provides a regulated governor pressure in the conduit 241 that increases with the speed of the driven shaft 26 and of the vehicle. The function of the spring 185 effectively between the weight 183 and the valve piston 176 is to allow the weight 183 to move outwardly of the casing 175 and radially with respect to the shaft 26 without corresponding movement of the piston 176 at the higher speeds of the shaft 26. This arrangement provides a governor pressure that increases more gradually with increases in speed of the driven shaft 26 than would be obtained if the piston 176 has a solid connection with the weight 183.

The governor pressure in the conduit 241 that increases with the speed of the driven shaft 26 and of the vehicle is impressed through the ports 232 and 237 on the compensator valve 105 and particularly on its pistons 216 and 218. The governor pressure applied on the piston 218 through the port 232 is not immediately effective on the piston 217, which is the regulating piston of the compensator valve 105, when the vehicle is being started, since line pressure is supplied between the lands 224 and 225 from the conduit 141 and the port 233. The governor pressure starts from zero when the vehicle is at a standstill and increases, while the line pressure is at some much higher value, such as 75 p.s.i. under the same conditions. Since the land 225 is larger than the land 224, the piston 218 is held to the limit of its movement to the right out of contact with the regulating piston 217 until the governor pressure increases sufficiently to overcome the effect of line pressure on the lands 224 and 225. The governor pressure in the conduit 241 is initially, at low speeds of the vehicle, effective through the valve piston 216 on the regulating valve piston 217. The governor pressure is applied through the port 237 on the piston 216 and force on the piston 216 is transmitted through the spring 227 to the piston 217 tending to move the latter to the right, the force so impressed on the piston 217 increasing with governor pressure and vehicle speed. At this time the flow range valve piston 387 is in its illustrated position.

The modulator pressure in the conduit 239 that increases with accelerator opening to a predetermined maximum is impressed on the lands 222 and 223; and since the land 222 is larger than the land 223, this modulator fluid pressure tends to move the compensator piston 217 to the left. This is just opposite to the effect of the increasing governor pressure in the conduit 241.

Line pressure is supplied to the port 234 from the conduit 141, and the piston 217 functions to regulate so as to provide compensator pressure in the conduit 238. This compensator pressure increases with increasing governor pressure in the conduit 241 and decreases with increasing throttle pressure in the conduit 215 and modulator pressure in the conduit 239. The springs 226 and 227 tend to hold the piston 217 to the limit of its movement to the right opening the port 234 by means of the groove between the lands 220 and 221 to the port 228 and the compensator conduit 238. Fluid thus flows into the compensator conduit 238. The compensator pressure in the conduit 238 flows through the port 229 between the lands 221 and 222 and tends to move the piston 217 to the left so as to close the port 234 by means of the land 221, this return movement of the piston 217 being by virtue of the fact that the land 221 is larger than the land 222. Thus, the land 221 meters fluid flow between it and an edge of the port 234, providing a certain regulated compensator pressure in the conduit 238. The governor pressure tends to move the piston 217 to the right as above described so as to move the land 221 off the port 234 and admit further fluid pressure to the compensator conduit 238. Thus, the compensator pressure in the conduit 238 increases with governor pressure and vehicle speed. The modulator pressure, as above described, tends to move the piston 217 to the left to close the line pressure supply port 234 by means of the land 221, and thus, the compensator pressure in the conduit 238 decreases with increasing throttle pressure and modulator pressure.

The piston 218, at higher speeds of the vehicle, reduces the effect of the governor pressure just described in increasing the compensator pressure in the conduit 238. As the governor pressure in the conduit 241 rises, eventually it is sufficient so as to move the piston 218 to the left, so that this piston acts on the piston 217 and tends to move the latter piston to the left against the force due to the governor pressure transmitted through the piston 216. The piston 218 is moved to the left by the governor pressure when the governor pressure overcomes the effect of the line pressure impressed through the port 233 on the lands 224 and 225 tending to move the piston 218 to the right. The line pressure in the conduit 141 and applied to the lands 224 and 225 decreases with increasing governor speeds as will be hereinafter described, and there thus exists a crossing of the effect of line pressu.e which decreases with increasing vehicle speed and governor pressure which increases with vehicle speed, both effective on the piston 218, after which the piston 218 is effective on the valve piston 217 and its regulating action.

When the vehicle begins to move, after the accelerator 192 has been moved toward its open throttle position to increase the speed and power output of the vehicle engine, the rear pump 99 begins its pumping action and draws fluid through the intake conduit 139 from the sump 136 and discharges it into the outlet conduit 140. The check valve 142 remains closed until the pressure of the fluid discharged by the rear pump 99 increases to a sufficient value to overcome the forces due to the line pressure and the spring 144 on the piston 143; and at this time, the check valve 142 opens and the rear pump discharges into the line pressure conduit 141. The fluid flow through the line pressure conduit 141 then reverses and closes the check valve 145 by moving the piston 146 upwardly onto its seat. The closing of the check valve 145 blocks discharge by the front pump 98 into the line pressure conduit 141 and its connected conduits, and the rear pump now becomes the sole supply of line pressure for the conduit 141 and connected conduits. The line pressure in the conduit 141 is impressed on the main oil pressure regulator valve piston 148 and particularly its lands 151 and 152 through the port 157 to provide the regulating action between the land 149 and the port 154 when the front pump alone is providing the line pressure, and when the line pressure increases slightly due to closing of the check valve 145 and opening of the check valve 142 as just described, the piston 148 is moved upwardly slightly, since the line pressure is effective to move the piston 148 in this direction due to the land 151 being larger than the land 152. Under these conditions, the port 154 is fully opened so as to connect the ports 154 and 159. The regulating effect of the valve 107 is now between the lower edge of the land 150 and the lower edges of the ports 155 and 159, with the excess pressure produced by the rear pump 99 escaping from the port 156 and the groove between the lands 150 and 151 to the ports 155 and 159. With the rear pump 99 being thus active to produce the line pressure, the line pressure is now regulated exactly as has been previously described, except that it is slightly higher in value and is metered between the land 150 and ports 155 and 159 instead of between an edge of the port 154 and the land 149. The front pump now functions solely to supply fluid under pressure to the converter 31 and for lubrication.

The compensator pressure in the conduit 238, as it changes with accelerator opening and vehicle speeds, causes a change in the line pressure regulating action of the main oil pressure regulator valve 107 as compared with its operation when the accelerator is in its closed throttle position and the vehicle is stationary. The pressure in the conduit 238 is impressed on the lower end of the main oil pressure regulator valve piston 148 through the port 158 and tends to move the piston 148 upwardly against its spring 153 to more fully open the port 154 or the ports 155 and 159 depending on which of these ports is regulating, with the driven shaft pump 101 being inactive in one case and active in the other case. The piston 148 thus vents the line pressure conduit 141 less and maintains the line pressure in the conduit 141 at a higher value as the compensator pressure in the conduit 238 decreases and acts conversely to maintain line pressure at a lower value as the compensator pressure increases. As has been explained, the compensator pressure in the conduit 238 increases with increasing governor pressure in the conduit 241 and increasing vehicle speed and decreases with increasing throttle pressure and throttle opening. Therefore, the line pressure, which is initially applied to the servo motor 117 for the front brake 34 and also through the piston 59 for the front clutch 32 for engaging these friction devices when selector valve piston 242 is in its D2 position, increases with accelerator opening and decreases with increasing vehicle speed. The line pressure is made to increase with increased accelerator opening so that the front clutch 32 and front brake 34 having the capacity to take the additional torque from the vehicle engine which results from depression of the accelerator 192 and opening of the engine throttle. As has been hereinbefore explained, the hydraulic torque converter 31 is of the usual type providing a decreased torque multiplication as the speed increases; and, therefore, line pressure can be and is decreased with increasing governor pressure and vehicle speed, since the engaging devices and the gearing behind the torque converter 31 need take a decreasing torque with a decreasing torque multiplication of the torque converter 31. The line pressure is also supplied to the servo motor 125 for the brake 35 and to the piston 65 for the clutch 33 for engaging these friction devices when the transmission is in low speed drive, at times, or high speed drive, as will be described. The line pressure is made to vary as above described, in accordance with throttle opening and vehicle speed, so that the engaging pressures of the friction brakes and clutches are just a little higher than is required to carry the torque by each of these clutches and brakes as the vehicle speed and engine throttle opening vary. It has been found that, if these clutches and brakes are engaged for changing drives through the transmission with such engaging pressures, which are just a little higher than sufficient for carrying the torque, the engagement of the friction engaging devices and the consequent completions of the power trains are relatively smooth.

The compensator pressure in the conduit 238 functions on the low oil pressure regulator valve 108 to cause an increase in the pressure within the torque converter 31 as the accelerator is depressed and to cause a decreaase in the pressure within the torque converter 31 as the vehicle speed increases. The compensator pressure is applied to the lower end of the regulator valve 108 and tends to move the piston 160 upwardly against the action of the spring 164 so as to increase the metering effect between the land 162 and the lower edge of the port 163, thereby relieving a greater amount of fluid from the torque converter 31 flowing through the outlet conduit 172 of the torque converter 31. Thus, as the compensator pressure in the conduit 238 increases, the bleeding effect of the valve 108 is increased to decrease the fluid pressure in the converter 31; and, as the compensator pressure decreases, this bleeding effect decreases to cause an increase in the pressure in the torque converter 31. Thus, the pressure in the torque converter 31 is increased as the vehicle accelerator is moved toward open throttle position, and the pressure in the torque converter is decreased as the vehicle speed increases. This regulating action of the fluid pressure in the torque converter 31 is provided, since a greater fluid pressure is required in the torque converter with increasing torque output of the vehicle engine; and a decreasing pressure in the torque converter 31 is sufficient with decreased torque multiplication by the torque converter with increasing vehicle speeds.

The 2–3 shift valve 111 has the governor pressure from the conduit 241 impressed on it through the branch conduit 289 and the ports 271 and 269. The governor pressure is effective on the upper end of the valve piston 260 and on the upper surface of the land 261 and tends to move the piston 260 and the piston 259 downwardly out of the intermediate speed positions of the pistons in which they are illustrated into their high speed drive positions. This movement of the valve pistons 260 and 259 is opposed by three different forces, namely, throttle pressure, exerted through the plug 258 and the spring 266, a "shift valve plug pressure" applied on the lower face of the land 261, and the force due to the spring 265. The throttle pressure is applied to the lower end of the valve piston 258 through the conduit 215 and the port 279; and this throttle pressure is effective through the spring 266 tending to oppose movement of the piston 259 downwardly. The spring 265 is effective between the land 261 and a fixed part and also tends to hold the piston 259 against such movement.

The plug 258 functions as a regulator valve to provide the "shift valve plug pressure" effective on the land 261. The throttle pressure in the conduit 215 applied to the lower end of the plug 258 tends to move the plug against the action of the spring 266 so as to open the port 267 and thereby supply pressure to the conduit 303 and the port 268 of the 2–3 shift valve. The pressure supplied to the port 268 flows into the cavity for the valve piston 259 and acts on the upper end of the plug 258 tending to return the plug 258 downwardly to a position blocking the port 267. The plug 258 thus functions as a regulating valve, opening the port 267 on an increase in throttle pressure and closing the port 267 when the pressure within the conduit 303 and within the cavity for the piston 259, which is termed the "shift valve plug pressure," becomes sufficient to augment the force due to the spring 266 sufficiently so as to move the plug 258 downwardly. This "shift valve plug pressure" increases with throttle pressure but is less than throttle pressure by a predetermined amount due to the force provided by the spring 266 on the plug 258. This "shift valve plug pressure" in the cavity for the piston 259 is applied on the lower face of the land 261 and also, in addition to the other two forces above mentioned, tends to hold the piston 259 from movement downwardly into its high speed drive position.

When the governor pressure in the conduit 241, which is applied to the 2–3 shift valve 111 through the ports 271 and 269, becomes sufficiently great, so that it overcomes the force on the pistons 260 and 259 due to the "shift valve plug pressure" on the lower face of the land 261, the force due to the spring 265, and the force due to the throttle pressure on the plug 258 exerted through the spring 266 on the piston 259; the pistons 258, 259 and 260 move to the limit of their movement downwardly into their high speed positions in which the groove between the lands 264 and 263 connects the ports 274 and 273. Line pressure is supplied to the port 274 of the 2–3 shift valve 111 from the conduit 282 and the port 246 in the manual valve 102, and line pressure thus flows between the lands 263 and 264, the port 273 and the conduit 281 to the piston 65 for the rear clutch 33 and engages the rear clutch 33. The front clutch 32 remains engaged, and the high speed power train is thus completed through the transmission.

The line pressure in the conduit 281 provided by the valve 111 when the piston 259 is moved into its high speed position is also supplied to the disapply cavity 123 of the servo motor 117 for the front brake 34. The piston 259 in its high speed drive position connects the ports 277 and 276 by means of the groove between the lands 262 and 263, and line pressure flows from the conduit 281, through the ports 277 and 276, the conduit 345, the port 328 of the orifice control valve 109, the groove between the lands 331 and 332 of the orifice control valve piston 330, the port 340 and the conduit 336 to the disapply cavity 123 of the servo motor 117 for the front brake 34. The orifice control valve 109 is under the control of throttle pressure in the throttle pressure conduit 215 which is applied on the upper end of the orifice control valve piston 330 through the port 337. The throttle pressure holds the piston 330 moved to the limit of its movement downwardly as seen in the figure against the action of the spring 335 whenever the accelerator is depressed to a substantial extent to provide a substantial throttle pressure. It is assumed that this change from intermediate speed drive to high speed drive is made when the accelerator is at some open throttle position so that the upper port 338 and the port 340 are completely opened with respect to each other; and, therefore, the fluid flowing through the conduit 345 to the disapply cavity 123 of the servo motor 117 is not impeded by the restriction 346 of the orifice control valve 109. The line pressure supplied to the disapply cavity 123 of the servo motor 117 augments the action of the spring 124 to move the piston 118 of the servo motor 117 back into its brake disapplying position, such movement being against the action of the line pressure within the cavity 122 of the servo motor 117. The disengagement of the brake 34 breaks the intermediate speed drive.

A downshift from high speed drive to intermediate speed drive may be obtained with the accelerator 192 released and with the vehicle coasting with decreasing speed to a stop. Under these conditions, the governor pressure supplied to the ports 271 and 269 of the 2–3 shift valve 111 is decreasing, and the throttle pressure applied to the plug 258 and the "shift valve plug pressure" applied on the lower face of the land 261 are substantially zero. Eventually, the governor pressure will decrease to the point at which the springs 266 and 265 are effective so as to move the pistons 259 and 260 upwardly to the limit of their movement into the intermediate speed positions of the pistons. The line pressure at the port 274 in the intermediate speed position of the piston 259 is blocked by the land 263, and the conduit 281, which has fluid pressure applied to it for completing the high speed drive, is drained to the sump through the port 273, the groove between the lands 263 and 264, the port 272, the conduit 350, the conduit 363, the port 357, the groove between the lands 352 and 353 of the reverse inhibitor valve 115, the port 358, the conduit 364 and the port 252 of the manual valve 102. The clutch 33 connected with the conduit 281 is thus released.

The disapply cavity 123 of the servo motor 117 for the front brake 34 is drained for this change of drive through the orifice control valve which functions under these conditions to retard the drain from the cavity 123 so as to cushion the engagement of the brake 34 and prevent an unduly harsh completion of the intermediate speed drive. Since the accelerator is released, the throttle pressure in the conduit 215 is at substantially zero value, and the spring 335 of the orifice control valve 109 is effective to hold the valve piston 330 at the limit of its movement upwardly so as to block the ports 339 and 340 with respect to the port 338. Pressure drains from the release cavity 123 through the conduit 326, the permanently connected ports 340 and 339, the restriction 346, the conduit 345, the port 276, the groove between the lands 262 and 263 of the 2–3 shift valve 111, the port 275, the conduit 347, the port 341, the groove between the lands 333 and 334 of the orifice control valve 109, the port 342, the conduit 348, the port 295, the groove between the lands 287 and 288 and the bleed port 296. In D2 position of the manual valve 102, as has been previously described, the 1–2 shift valve piston 284 is held at the limit of its movement downwardly against the action of the spring 304 by line pressure impressed on its upper end, and the groove between the lands 287 and 288, under these conditions, thus connects the ports 295 and 296. Since the fluid from the release cavity 123 of the servo motor 117 drains through the restriction 346, application of the brake 34 is delayed, thereby smoothing the shift from third speed ratio to second speed ratio with the accelerator in closed throttle position.

A kickdown, that is, a downshift at open throttle position of the accelerator 192, may be had due to the action of the downshift valve 103. Movement of the accelerator 192 to an open throttle position and a corresponding movement of the downshift valve piston 186 connects the ports 190 and 189 by means of the groove between the lands 187 and 188. The port 190 is connected with the line pressure supply conduit 141, and line pressure is thus supplied through the port 189 and the conduit 283 connected therewith to a port 278 of the 2–3 shift valve 111. Assuming that the transmission is in direct drive, and the pistons 258, 259 and 260 are in their direct drive positions to the limit of their movement downwardly, the port 278 is open with respect to the land 261; and line pressure from the port 278 is thus applied onto the lower face of the land 261. This application of line pressure moves the pistons 260 and 259 to the limit of their movement upwardly into their intermediate speed drive positions, assuming that the vehicle is not traveling at an unduly high speed at which the governor pressure applied to the pistons 260 and 259 through the ports 269 and 271 would be sufficient to prevent this movement. This shift valve piston 259 in its intermediate speed position drains the conduit 281 as previously described so as to disengage the rear clutch 33.

The 2–3 shift valve 111 in its intermediate speed drive position also connects the ports 275 and 276 by means of the groove between the lands 262 and 263 as has been previously described, and the disapp'y cavity 123 of the front brake servo motor 117 is drained through the orifice control valve 109, the 2–3 shift valve 111 and the 1–2 shift valve 113 as previously described. For a kickdown condition, when the accelerator is in its open throttle position, the throttle pressure in the conduit 215 is relatively high, and this is impressed through the port 337 on the land 331 of the orifice control valve 109 holding the piston 330 of this valve at the limit of its movement downwardly against the action of the spring 335. In this case, therefore, draining of the conduit 326 and the release cavity 123 of the servo motor 117 takes place around the restriction 346, through the port 340, the groove between the lands 331 and 332 and the port 338, so that the application of the front brake 34 is relatively rapid as is desired under high engine torque conditions.

The manual valve 102, in its D1 position, so controls the transmission that it will start in low speed drive and on increasing vehicle speed will shift into intermediate speed drive and thereafter will subsequently shift into high speed drive. The manual control valve piston 242 in its D1 position connects the same ports with the line pressure supply port 249 as were connected in the D2 position of the manual valve piston 242, with the exception that the port 253 is blocked with respect to the port 249 and is drained through the front end of the cavity in which the manual valve piston 242 is disposed. The release of fluid pressure in the port 253 causes a corresponding bleeding of fluid pressure from the lower end of the range control valve 114, the flow being through the port 310, the conduit 312 and the port 253. The upper end of the range control valve 114 is connected by means of the port 307 with the governor pressure output conduit 241, and the governor pressure is exerted on the upper end of the range control valve piston 305 moving it to the limit of its movement downwardly, whenever there is any governor pressure with movement of the vehicle, so that the ports 307 and 308 are connected. The governor pressure is thus supplied through the conduit 311 and the port 291 on the upper end of the 1–2 shift valve 113. Prior to such movement, assuming that the valve 102 is put into D1 position when the vehicle is stationary and the governor pressure is zero, the conduit 311, together with the upper end of the cavity in which the piston 284 is disposed, are drained through the ports 309 and 310 connected whenever line pressure is applied on the lower end of the range control valve piston 305 as in the D2 range. The spring 304, under these conditions, holds the 1–2 shift valve piston 284 upwardly in its low speed position and thus assures that the piston 284 is in its low speed position when a start is made in the D1 range.

The 1–2 shift valve piston 284, when in its low speed position shifted to the limit of its movement upwardly, connects the ports 294 and 295 by means of the groove between the lands 287 and 288. The port 294 carries line pressure from the conduit 254 and port 248 of the manual valve 102, and line pressure is thus supplied to the conduit 348 connected with the port 295. Fluid pressure flows from the conduit 348 and through the ports 342 and 341 and between the lands 333 and 334 of the orifice control valve 109. The fluid pressure flows through the conduits 347 and 386 and the restriction 385 to the port 381 of the check valve 100, thence through the port 380, and conduit 384 to the port 324 of the transition valve 110; however, the pressure is blocked in the transition valve 110 by the land 317. Fluid pressure also flows from the conduit 347 through the port 275, the groove between the lands 262 and 263 of the valve 111, the port 276, the conduit 345, the ports 339 and 340 and the conduit 326 to the port 319 of the transition valve 110 to raise the pistons 313 and 314. The ports 324 and 323 are thus connected so that fluid pressure flows through the conduit 327 to the servo 125 for engaging the rear brake 35.

Line pressure also flows from the conduit 343 to the disapply cavity 123 of the servo motor 117, maintaining the brake 34 disengaged as has been previously described in connection with other conditions of operation of the transmission.

In the D1 position of the manual valve 102, the port 247 and its connected conduit 366 remain supplied with line pressure as in the D2 position of the manual valve piston 242, and this line pressure is supplied through the reverse inhibitor valve 115 and the conduit 365 to both the front clutch 32 for holding the clutch 32 engaged and also to the governor valve 116. Since the clutch 32 is engaged along with the brake 35 the low speed power train through the transmission is completed.

In D1 range, as the vehicle speed increases and the governor pressure in the conduit 241 and connected conduits increases; the increasing governor pressure, applied through the ports 307 and 308 of the range control valve 114, the conduit 311 and the port 291 on the upper end of the 1–2 shift valve 113, tends to move the 1–2 shift valve piston 284 from its low speed position, in which it is illustrated, to its intermediate speed position which is at the limit of its movement downwardly. The piston 284 moves from its low to its intermediate speed position against the action of the spring 304, and the "shift valve plug pressure" also opposes this movement of the 1–2 shift valve piston 284. As has been previously explained, the "shift valve plug pressure" is present in the ports 267 and 268 of the 2-3 shift valve 111, and the "shift valve plug pressure" is transmitted through the conduit 303, the port 298, the groove between the lands 285 and 286 of the piston 284 when it is in its low speed position, and the ports 299 and 301 to the lower end of the piston 284. When the governor pressure increases sufficiently to overcome the "shift valve plug pressure" and the force due to the spring 304, the 1-2 shift valve piston 284 moves to the limit of its movement downwardly into its intermediate speed position.

In the intermediate speed position of the valve 113, the port 294 carrying line pressure is blocked; and the port 295, which in the low speed position of the 1-2 shift valve piston 284 has line pressure applied to it, is drained to the sump through the bleed port 296 and the groove between the lands 287 and 288. The disapply cavity 123 of the front brake 34 is drained through the conduit 326, the port 340, the port 338 connected with the port 340 by means of the groove between the lands 331 and 332 of the orifice control valve 109, the conduit 345, the port 276, the groove between the lands 263 and 262, the port 275, the conduit 347, the ports 341 and 342, the conduit 348, the port 295, the groove between the lands 288 and 287 and the bleed port 296. It is assumed at this time that the orifice control valve piston 330 is moved to the limit of its movement downwardly as seen in the figure against the action of the spring 335 by throttle pressure existing in the conduit 215 and applied to the land 331 of the orifice control valve. The brake 34 is thus applied, and since the clutch 32 remains applied, the transmission is now in intermediate speed drive.

A subsequent upshift to high speed drive is obtained through the action of the 2-3 shift valve 111. This valve is subject to the governor pressure that increases with the speed of the vehicle, and this valve 111 is moved into its high speed position to complete the high speed drive by action of the increasing governor pressure in the same manner as in the D2 range.

A shift from direct drive to intermediate speed drive with the accelerator released and the vehicle speed decreasing or when the accelerator is moved to an open throttle kickdown position may be had in the D1 range in the same manner as in the D2 range.

A downshift from intermediate speed ratio to low speed ratio also may be obtained while the vehicle is traveling in intermediate speed by moving the accelerator 192 to its kickdown position, and such change in drive will occur assuming that the speed of the vehicle is not unduly high. As previously described, when the accelerator 192 is in its kickdown position, the downshift valve piston 186 connects the ports 190 and 189 thus supplying line pressure to the conduit 283. The line pressure flows from the conduit 283 to the port 297 of the 1-2 shift valve 113, and line pressure is effective on the large diameter land 287 tending to move the valve piston 284 upwardly into its low speed position against the governor pressure effective on the upper end of the piston 284. Assuming that the vehicle speed and the governor pressure are not unduly high, the piston 284 will move upwardly into its low speed position. Line pressure flows from the conduit 254 through the port 294 and the groove between the lands 287 and 288 of the 1-2 shift valve 113 and into the port 295 and the conduit 348 for completing the low speed drive as has been previously described.

The 1-2 shift valve piston 284 may also be allowed to move from its intermediate speed position to its low speed position simply by allowing the vehicle to gradually decrease in speed with a resultant decrease in governor pressure so that the spring 304 is effective to move the piston 284 back to its low speed position. Under these conditions, the 1-2 shift valve piston 284 will again provide line pressure to the conduit 348 for releasing the front brake 34 to again cause completion of the low speed power train. The rear servo check valve functions on such a downshift to effectively insert the restriction 385 into the supply line 384 connected to the servo motor 125 for the rear brake 35 whenever the throttle pressure is below a certain value, since the spring 379 holds the piston 376 in its illustrated position under these conditions, and the engagement of the rear brake 35 is thus cushioned to prevent an unduly harsh engagement. When the accelerator is depressed, the restriction 385 is by-passed by the valve 100, the piston 376 being moved upwardly against the spring 376 so as to connect the restriction by-pass ports 382 and 380.

The transition valve 110 functions to prevent the supply of pressure through the conduit 327 to the servo 125 until there has been a predetermined degree of disengagement of the brake 34, as determined by the pressure within the disapply cavity 123 of the front brake servo 117. The pressure in the conduit 326 supplied to the disapply cavity 123 of the servo 117 is also applied on the piston 313 of the valve 110 through the port 319, and the land 317 effectively blocks the port 324 with respect to the port 323 until the pressure within the cavity 123 is sufficient to raise the transition valve piston 314 against the action of the spring 318. Until such movement of the piston 314, application of pressure through the conduit 327 to the servo 125 for the rear brake 35 is prevented so that a predetermined disengagement of the brake 34 must occur before initiation of engagement of the brake 35 occurs.

When the manual valve piston 242 is moved into its L position, assuming that this is done while the vehicle is at rest, the low speed power train through the transmission will be completed. The manual valve piston 242 in its L position connects the ports 248 and 247 with the line pressure supply port 249 by means of the groove between the lands 244 and 243 and connects the port 251 with the line pressure supply port 250, the latter being connected along with the port 249 with the line pressure supply conduit 141. The line pressure supplied to the port 247 and the conduit 366 connected therewith supplies pressure as in previous drives through the reverse inhibitor valve 115 to the front clutch 32 for engaging it and also to the governor valve 116. As in previous drives, the line pressure supplied to the port 248 and the conduit 254 provides line pressure to the apply cavity 122 of the servo motor 117 for the front brake 34 and also to the port 294 of the 1-2 shift valve 113. Line pressure is supplied from the port 250 of the manual valve 102 between the lands 244 and 245 to the port 251 and thereby to the conduits 255 and 302. The line pressure in the conduit 255 flows through the port 191, the groove between the lands 187 and 188 of the downshift valve 103, the port 189 and the conduit 283 to both the port 278 of the 2-3 shift valve 111 and also to the port 297 of the 1-2 shift valve 113. The line pressure supplied to the port 278 acts on the lower face of the land 261 and holds the 2-3 shift valve piston 259 upwardly in its intermediate speed position regardless of subsequent increases in vehicle speed and governor pressure.

The line pressure within the cavity for the 2-3 shift valve also flows through the port 268, the conduit 303, the port 298, the groove between the lands 285 and 286 of the 1-2 shift valve 113 and the port 299 to the port 301, so that the line pressure is impressed on the bottom end of the 1-2 shift valve piston 284 tending to hold the piston upwardly regardless of increases in governor output pressure.

The line pressure in the conduit 302 flows through the port 292 of the 1-2 shift valve 113 and is impressed on the lands 289 and 290, and the line pressure so applied also tends to hold the shift valve 284 upwardly in its low speed drive position. The 1-2 shift valve, when so held in its low speed position, supplies fluid pressure to the conduit 348 through the ports 294 and 295, and as has been previously explained, fluid pressure is supplied from the conduit 348 eventually to the release cavity 123 of the servo motor 117 for the front brake 34 through the conduits 347, 345 and 326.

The line pressure in the conduit 326 also acts through the port 319 on the lower end of the transition valve 110 and moves the pistons 313 and 314 upwardly against the spring 318. The line pressure flows also from the conduit 347 through the rear servo check valve 100, the conduit 384, the ports 324 and 323 of the transition valve 110 and the conduit 327 to the servo 125 for engaging the rear brake 35. The low speed power train is thus completed.

Line pressure also flows from the conduit 255 through the conduits 395 and 394 to the port 214 of the throttle modulator valve 106. The line pressure as so applied to the left end of the modulator valve 106 moves the piston 203 of this valve to the limit of its movement to the right, so that this valve piston connects together the ports 213, 210 and 212. The throttle pressure in the conduit 215 and supplied to the port 210 is thus supplied to both the ports 212 and 213 and thereby through the conduits 240 and 239 to the ports 230 and 231 of the compensator valve 105. Line pressure is thus supplied not only to the land 222 but also to the land 223 of the compensator valve 105 tending to maintain the land 221 blocking the line pressure supply port 234. The compensator pressure in the conduit 238 thus is lower for the low range drive than for the other forward drives.

Line pressure is also supplied from the conduit 395 to the port 390 of the low range valve 101 to move the piston 387 to the limit of its movement to the right as seen in the drawing. This has the effect of disconnecting the left end of the compensator valve 105 from the governor pressure that exists in the conduit 241 and exhausts the left end of the compensator valve through the port 392, the groove between the lands 389 and 388 and the port 391. Governor pressure is still applied through the port 232 on the right end of the compensator valve 105, and this governor pressure augments the action of the throttle pressure in the conduits 239 and 240, tending to move the piston 217 to the left. The full throttle pressure applied through the conduits 239 and 240 on the compensator valve 105 and the removal of the goveror pressure from the left end of the compensator valve 105 by the low range valve 101 have the effect of materially decreasing the compensator pressure in the conduit 238 and consequently increasing line pressure in the conduit 141. Due to the removal of governor pressure on the left end of the compensator valve 105, line pressure no longer decreases to a minimum value with increases of vehicle speed and governor pressure. The governor pressure remains applied to the right end of the compensator valve 105 and augments the action of the throttle pressure in the conduits 239 and 240 and causes the line pressure to increase rather than decease as the vehicle speed and governor pressure increase. As the vehicle speed diminishes, the governor pressure effective on the right end of the compensator valve diminishes accordingly, and the normal coast or idle line pressure exists with such diminishing of governor pressure. This increase of line pressure with increases in vehicle speeds, as contrasted to a decrease in line pressure with increases of vehicle speed previously described, is provided for proper non-slipping engagement of the front brake 34 when the selector 256 is moved into its L position when the vehicle is traveling in direct drive, as will now be explained.

Assuming that the vehicle is traveling at a substantial speed in direct drive in either its D1 or D2 range, and the selector valve 102 is then moved into its L position, the transmission will be downshifted into its intermediate speed drive and subsequently into its low speed drive as the vehicle speed decreases. When the manual selector valve piston 242 is in its L position, the conduits 302 and 283 are pressurized with line pressure, as has just been described, and the pressure in conduit 283 is transmitted through the port 278 of the 2–3 shift valve so that the line pressure augments the action of the springs 265 and 266 in moving the 2–3 shift valve piston 259 upwardly into its intermediate speed position, this movement taking place assuming that the governor pressure is not too high. The piston 65 for the rear clutch 33 and the disapply cavity 123 of the servo 117 for the front brake 34 are drained to the sump in the same manner as has been previously described in connection with a closed throttle downshift from third to second in the D2 range, and the transmission is in its intermediate speed drive.

I have found that, in such a ratio change from direct drive to intermediate speed drive, slippage of the front brake 34 tends to occur at the higher vehicle speeds and does occur, if the line pressure is not raised substantially from that which exists in the D1 and D2 ranges at the particular vehicle speed and throttle opening then existing. The brake 34 is so constructed that it tends to unwrap in the coast direction which occurs when the brake 34 is engaged for the purpose of retarding the vehicle, and this aggravates the slipping condition. Such a slipping condition would not provide the vehicle engine braking desired when the selector 256 is moved into its low range position at higher vehicle speeds and is undesirable from a wear standpoint. Since the difficulty is speed conscious, the low range valve 101 has been provided which blocks the application of governor pressure to the left end of the compensator valve 105 allowing it to remain applied to the right end of the valve 105 to augment the action of the throttle pressure in conduits 239 and 240. The compensator pressure in conduit 238 under these conditions is thus lowered, and the line pressure is made higher for higher vehicle speeds, and due to the provision of the higher line pressure, the brake 34 holds without slipping under coast conditions when the selector valve 102 is moved into its L position at higher vehicle speeds, such as, above 30 miles per hour. The low range valve, as will be observed, thus changes the regulation of line pressure from values that decrease with increasing governor speeds for the D1 and D2 drive ranges to values that increase with increasing governor speeds in the L range, for the purpose of overcoming this slippage condition.

Line pressure is effective through the port 292 from the conduit 302 on the land 290 of the 1–2 shift valve piston 284 when the piston 284 is in its intermediate speed drive position, tending to move the piston upwardly against the action of governor pressure from the conduit 311 into the low speed position of the valve piston 284. When the governor pressure decreases sufficiently, the piston 284 moves into its low speed position under the influence of the line pressure impressed on the lower surface of the land 290 and also due to the action of the spring 304. In this position, the groove between the lands 287 and 288 of the piston 284 connects the port 294 having line pressure applied to it and the port 295, thus supplying line pressure to the conduit 348. The application of line pressure to the conduit 348 causes the rear brake 35 to be engaged and the front brake 34 to be disengaged by the application of line pressure to the servo 125 and to the relief cavity 123 of servo 117 as has been previously described. The transmission is then in low speed drive.

In connection with the reverse inhibitor valve 115, it should be noted that initially, for low vehicle speeds, line pressure for all forward drive positions of the manual selector valve 102 flows from the port 247 through the conduit 366, the port 361, the groove between the lands 353 and 354 and the port 360 to the conduit 365 which supplies line pressure to the front clutch 32 and also to the governor valve 116. The reverse inhibitor valve piston 351 has governor pressure from the conduit 241 effective on its lower end tending to move the piston 351 upwardly against the action of its spring 355, and increasing governor pressure will move the piston 351 upwardly in this manner so as to block the port 361.

Application of line pressure to the conduit 365 is, however, not disturbed; since when the piston 351 is so moved, it connects the ports 359 and 360 by means of the groove between the lands 353 and 354, and the port 359 is supplied with line pressure for all forward drive positions of the manual selector valve piston 242 from the port 248 and the conduit 254.

The manual selector valve piston 242 is placed in its R position in order to cause completion of the reverse drive through the transmission. In this position, the groove between the lands 243 and 244 of the valve piston 242 connects the line pressure supply port 249 with the port 248, and the groove between the lands 244 and 245 connects the line pressure supply port 250 with the ports 251 and 252. The line pressure supplied to the port 248 flows through the conduit 254, as for the other drives previously described, to the brake engaging cavity 122 of the servo motor 117 for the front brake 34 and to the port 294 of the 1–2 shift valve 113. Line pressure flows from the port 251, as for the low range drive just described, to the throttle modulator valve 106 and the low range valve 101 for increasing the line pressure, to the ports 278 and 292 of the 2–3 shift valve 111 and the 1–2 shift valve 113 for maintaining these valves in their downshifted positions and through the 1–2 shift valve 113 through ports 294 and 295 to the disapply cavity 123 of the front servo 117 and to the servo 125 for the rear brake 35. The brake 35 is thus engaged and the brake 34 is disengaged. Line pressure flows from the port 252 of the manual valve 102 through the conduit 364, the port 358, the groove between the lands 352 and 353 of the reverse inhibitor valve 115, the port 357 and the conduit 363 to the conduits 350, 349 and 375. Line pressure flows from the conduit 350 through the port 272, the groove between the lands 263 and 264, the port 273, and the conduit 231 to the piston 65 for engaging the rear clutch 33. Since both the rear clutch and rear brake 35 are engaged, reverse drive is completed.

Fluid pressure also flows from the conduit 281 through the conduit 328 to the upper end of the transition valve 110 for augmenting the action of the spring 318. The pressure in the conduit 349 is applied through the port 329 to the lower end of the transition valve piston 314, and since line pressure is also present in the conduit 326 from the ports 294 and 295 in the 1–2 shift valve and from the port 248 in the manual valve 102 as described previously in connection with the low range drive, the pressure applied to both the lower end of the piston 314 and also the lower end of the piston 313 causes the piston 314 to be moved upwardly against the action of line pressure applied to its upper end and the action of the spring 318 to connect the ports 324 and 323 by the groove between the lands 316 and 317 for supplying line pressure to the servo 125 for the rear brake 35. The line pressure in the conduit 350 is also supplied to the port 343 of the orifice control valve 109, and this valve remains in its illustrated position.

Line pressure is supplied from the conduit 375 to the port 374 of the safety valve 112 and moves the piston 367 of the safety valve upwardly against the action of its spring 370, so that the groove between the lands 369 and 368 connects the governor pressure conduit 241 with the bleed port 373. The safety valve 112 thus assures that there can be no governor pressure existing in the conduit 241 and connected conduits when the transmission control system is set for reverse drive.

The purpose of the reverse inhibitor valve 115 is to prevent the completion of reverse drive when the vehicle is traveling above a predetermined speed in forward direction, such as 10 m.p.h. and the manual valve piston 242 is put into its R position. The inhibitor valve 115 has been designed so as to actually put the transmission in low range instead of reverse drive when the manual valve piston 242 is moved to its R position above the predetermined low forward vehicle speed.

The output governor pressure in the conduit 241 is impressed on the lower end of the reverse inhibitor valve piston 351 so that the piston 351 is at the upper limit of its movement above the predetermined low forward vehicle speed, being moved against the action of its spring 355. In its upper position, the piston 351 connects the ports 359 and 360 by means of the groove between the lands 353 and 354 and connects the conduit 363 to the bleed port 356 by means of the port 357 and the groove between the lands 352 and 353. The land 353 in the upper position of the piston 351 also blocks the port 358 connected with the conduit 364 which is pressurized in the reverse drive position of the manual piston 242. The reverse inhibitor valve thus in its upper position as shifted by governor pressure in the conduit 241 effectively supplies line pressure to the port 360 which engages the front clutch 32 and energizes the governor 116 and also drains the port 357 connected with the conduit 363, which, by the application of fluid pressure thereto, engages the rear clutch 33 for reverse drive.

The low range valve 101 advantageously assures that the line pressure applicable to the servo 117 for the brake 34 increases rather than decreases with increasing vehicle speed. Therefore, when the selector valve 102 is moved into its low range position when the vehicle is traveling at a substantial speed, such as above 30 m.p.h., for the purpose of causing the transmission to downshift to provide engine braking on the vehicle, the line pressure is increased sufficiently so as to assure that there is no slippage of the brake 34 even though the brake is acting in a self-deenergizing direction. Undue and excess wear of the brake band 67 is also avoided by the provision of the valve 101.

I wish it to be understood that the invention is not to be limited to the specific constructions and arrangements shown and described, except only insofar as the claims may be so limited, as it will be understood to those skilled in the art that changes may be made without departing from the principles of the invention.

I claim:

1. In transmission mechanism, the combination of a drive element, a driven element, a friction engaging mechanism for completing a drive between said elements when engaged, a source of fluid pressure, means for connecting said pressure source with said engaging mechanism to engage it, a speed responsive device, pressure regulator means effective on said pressure source, means interconnecting said speed responsive device and said regulating means so as to cause said fluid pressure to decrease with speed increases for one condition of drive between said elements, and means interconnecting said speed responsive device and said regulating means so as to cause said fluid pressure to increase with speed increases for another condition of drive between said elements.

2. In transmission mechanism, the combination of a drive element, a driven element, a fluid pressure engaged friction engaging mechanism for completing a drive between said elements when engaged, a source of fluid pressure, means for connecting said pressure source with said engaging mechanism to engage it and including a manually controlled selector providing one condition of drive in one position thereof and another condition of drive in another position thereof, a speed responsive device, pressure regulating means effective on said pressure source, means under the control of said manual selector and interconnecting said speed responsive device and said regulating means so as to cause said fluid pressure to decrease with speed increases for one of said conditions of drive between said elements, and means under the control of said manual selector and interconnecting said speed responsive device and said regulating means so as to cause said fluid pressure to increase with speed increases for the other of said conditions of drive between said elements.

3. In transmission mechanism, the combination of a drive element, a driven element, a fluid pressure engaged friction engaging mechanism for completing a drive between said elements when engaged, a source of fluid pressure, a manually controlled selector valve having two different drive positions in both of which it may cause connection of said pressure source with said engaging mechanism to engage it, a governor responsive to the speed of said driven element, a pressure regulating valve effective on said pressure source, means interconnecting said selector valve and said governor and said regulating valve so as to cause said fluid pressure to decrease with speed increases of said driven element in one position of said selector valve, and means interconnecting said selector valve and said governor and said regulating valve so as to cause said fluid pressure to increase with driven element speed increases for the other position of said selector valve.

4. In transmission mechanism, the combination of a drive element, a driven element, means for providing a power train between said elements and including planetary gearing and a friction brake for a reaction member of said gearing, said friction brake being self-energizable for a drive from said drive element to said driven element and being self-deenergizable for a drive in the opposite direction, a source of fluid pressure, means for connecting said pressure source with said friction brake to engage it, a speed responsive device, pressure regulator means effective on said pressure source, means interconnecting said speed responsive device and said regulator means so as to cause said fluid pressure to decrease with speed increases for a drive from said drive element to said driven element, and means interconnecting said speed responsive device and said regulator means so as to cause said fluid pressure to increase with speed increases for a drive between said elements in the opposite direction.

5. In transmission mechanism for an automotive vehicle with a driving engine, the combination of a drive element, a driven element, means for completing a plurality of drives between said elements and including planetary gearing and a fluid pressure engaged friction brake for a reaction member of said gearing for completing one of the drives, a source of fluid pressure, means for connecting said pressure source with said friction brake to engage it and including a manually controlled selector valve having a vehicle driving position and an engine braking position, a governor responsive to the speed of said driven element, pressure regulating means effective on said pressure source, means interconnecting said governor and said regulating means and said valve so as to cause said fluid pressure to decrease with driven element speed increases for the vehicle driving position of said selector valve, and means interconnecting said governor and said regulating means and said valve so as to cause said fluid pressure to increase with speed increases of said driven element for the engine braking position of said selector valve.

6. In transmission mechanism for an automotive vehicle with a driving engine, the combination of a drive element, a driven element, means for providing a plurality of different ratio drives between said elements and including planetary gearing and a fluid pressure engaged friction brake for a reaction member of said gearing for completing a certain speed drive, a source of fluid pressure, a governor responsive to the speed of said driven element, means for effectively connecting said pressure source with said brake and said drive providing means and including a selector valve having a vehicle driving position and an engine braking position, said governor being effective for changing the transmission mechanism from a lower ratio drive completed by said friction brake to a higher ratio drive in the vehicle driving position of the selector valve and being effective for changing the transmission mechanism from a higher ratio drive to a lower ratio drive as completed by said friction brake in the engine braking position of said selector valve, said friction brake being self-energizable for a drive from said drive element to said driven element and being self-deenergizable for a drive in the opposite direction, a pressure regulating valve effective on said pressure source, hydraulic means interconnecting said governor and said regulating valve and said selector valve so as to cause said fluid pressure to decrease with driven element speed increases when said selector valve is in its vehicle driving position, and hydraulic means interconnecting said governor and said regulating valve and said selector valve so as to cause said fluid pressure to increase with driven element speed increases when said selector valve is in its said other position.

7. In transmission mechanism for an automotive vehicle having a driving engine, the combination of a drive element, a driven element, means for providing a drive between said elements and including planetary gearing and a fluid pressure engaged friction brake for a reaction member thereof completing the drive when engaged, said friction brake being self-energizable for a drive from said drive element to said driven element and being self-deenergizable for a drive in the opposite direction, a source of fluid pressure, means for connecting said pressure source with said friction brake to engage it and including a selector valve having a vehicle braking position and an engine driving position and effective in both to make said connection, a pressure regulator valve effective for regulating the pressure of said source, a governor driven by said driven element and providing a governor fluid pressure that increases with the speed of said driven element, said regulator valve having two different opposing lands thereof connected to said governor pressure so that the pressure of said source decreases with increases in speed of said driven element for the vehicle driving position of said selector valve, and a shuttle valve under the control of said selector valve for blocking the application of governor pressure to one end of said regulator valve when the selector valve is in its vehicle braking position so that the pressure of said source increases with increases in speed of said driven element for this position of said selector valve.

References Cited in the file of this patent

UNITED STATES PATENTS 2,766,639    Rosenberger  ------------ Oct. 16, 1956